United States Patent [19]
Okino et al.

[11] Patent Number: 5,920,349
[45] Date of Patent: Jul. 6, 1999

[54] IMAGE PICKUP DEVICE

[75] Inventors: Tadashi Okino; Takashi Sasaki, both of Yokohama, Japan

[73] Assignee: Canon Kabushiki Kaisha, Tokyo, Japan

[21] Appl. No.: 08/384,684

[22] Filed: Feb. 6, 1995

Related U.S. Application Data

[63] Continuation of application No. 07/787,149, Nov. 4, 1991, abandoned.

[30] Foreign Application Priority Data

Nov. 5, 1990 [JP] Japan ................................. 2-297081
Jun. 24, 1991 [JP] Japan ................................. 3-151278
Jun. 24, 1991 [JP] Japan ................................. 3-151279

[51] Int. Cl.⁶ .................................................. H04N 5/232
[52] U.S. Cl. ......................... 348/354; 348/349; 348/350
[58] Field of Search ................................. 348/345, 349, 348/354, 356, 355, 350, 420, 384, 399; 354/400, 402, 404; 382/248, 250; H04N 5/232

[56] References Cited

U.S. PATENT DOCUMENTS

| | | | |
|---|---|---|---|
| 4,969,045 | 11/1990 | Haruki et al. . | |
| 5,065,246 | 11/1991 | Takemoto et al. . | |
| 5,128,768 | 7/1992 | Suda et al. ................................ | 348/350 |
| 5,172,236 | 12/1993 | Takemoto et al. ....................... | 348/354 |
| 5,187,755 | 2/1993 | Aragaki .................................... | 134/384 |
| 5,198,940 | 3/1993 | Nagasawa et al. ...................... | 348/384 |
| 5,309,183 | 5/1994 | Sassaki et al. ........................... | 348/233 |
| 5,323,233 | 6/1994 | Yamagami et al. ..................... | 348/277 |
| 5,341,170 | 8/1994 | Takemoto ................................ | 348/354 |
| 5,583,568 | 12/1996 | Suga et al. ............................... | 348/234 |

FOREIGN PATENT DOCUMENTS 3-96178  4/1991  Japan .

*Primary Examiner*—Andrew I. Faile
*Assistant Examiner*—Tuan V. Ho
*Attorney, Agent, or Firm*—Fitzpatrick, Cella, Harper & Scinto

[57] ABSTRACT

An image pickup device is provided with a phototaking optical system for guiding light from an object to an image sensor which produces image information from the received light; a dividing unit for dividing the image information from the image sensor into plural blocks; an extraction unit for extracting from the plural blocks divided by the dividing unit, those with a relatively high content of high-frequency components; a detection unit for detecting focus information relating to the focus state of the phototaking optical system based on frequency information relating to the frequency components of the blocks extracted by the extraction unit; and a driving unit for driving the phototaking optical system according to the focus information.

12 Claims, 20 Drawing Sheets

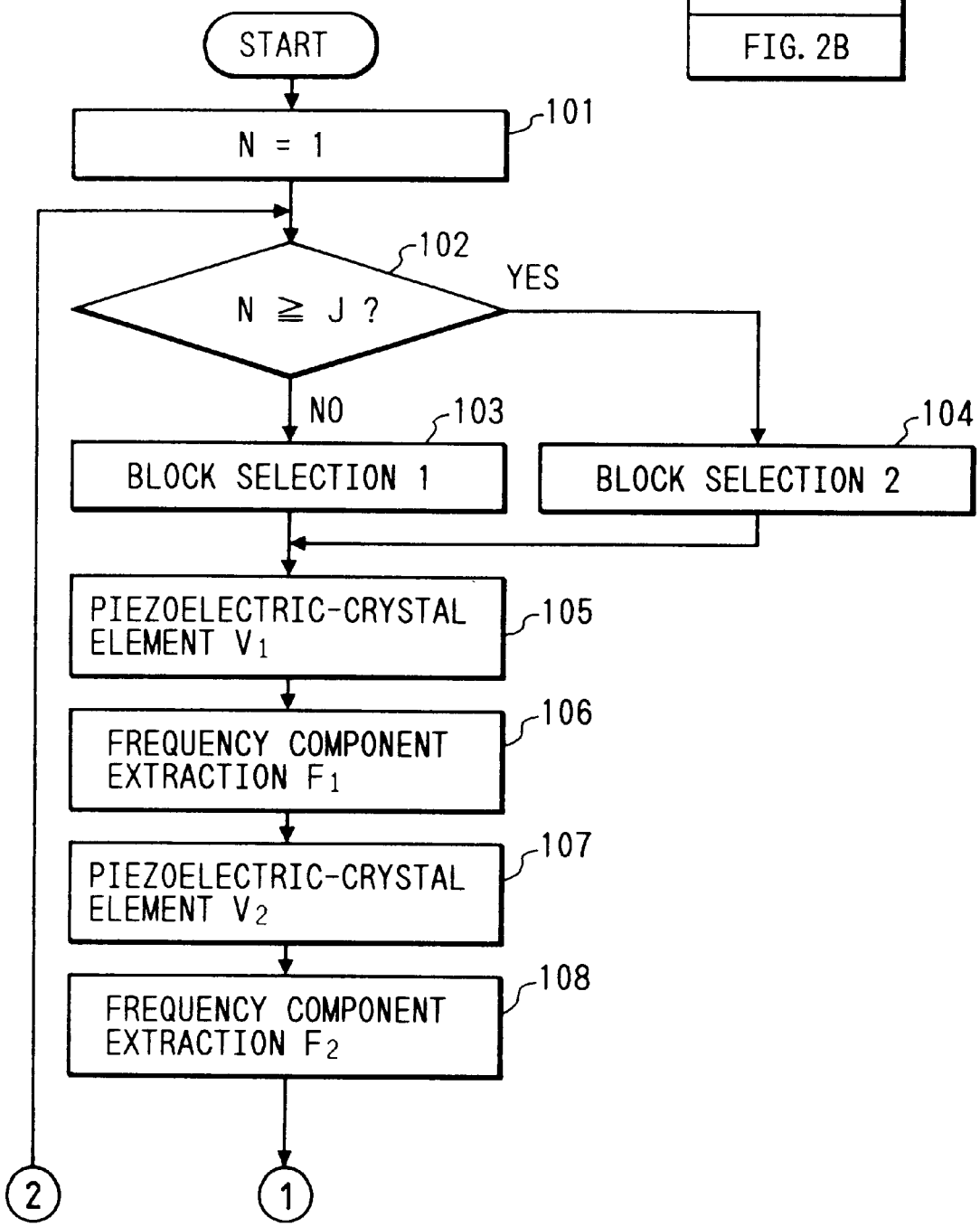

FIG. 3

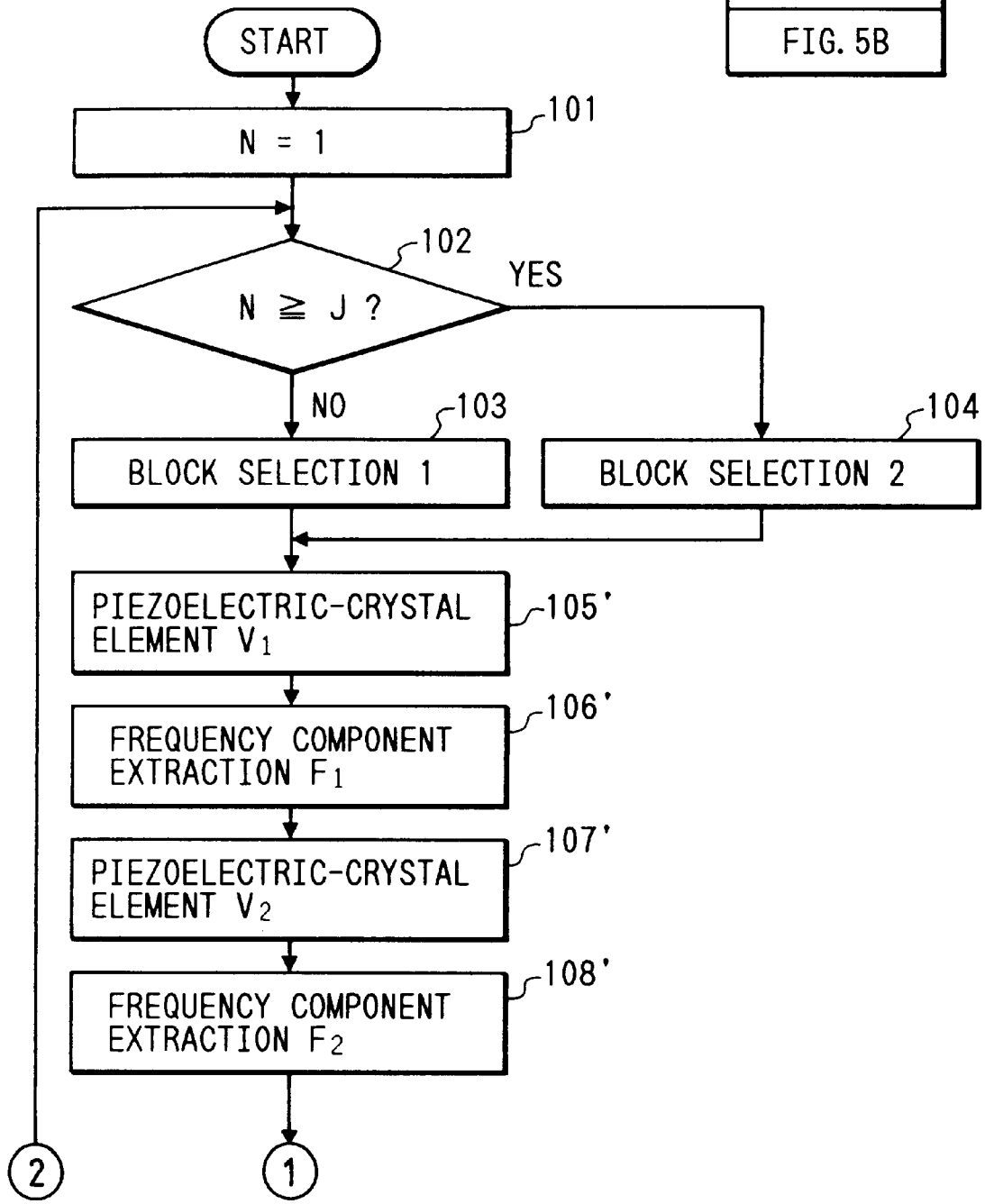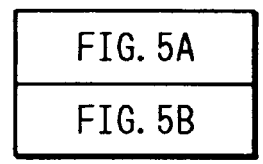

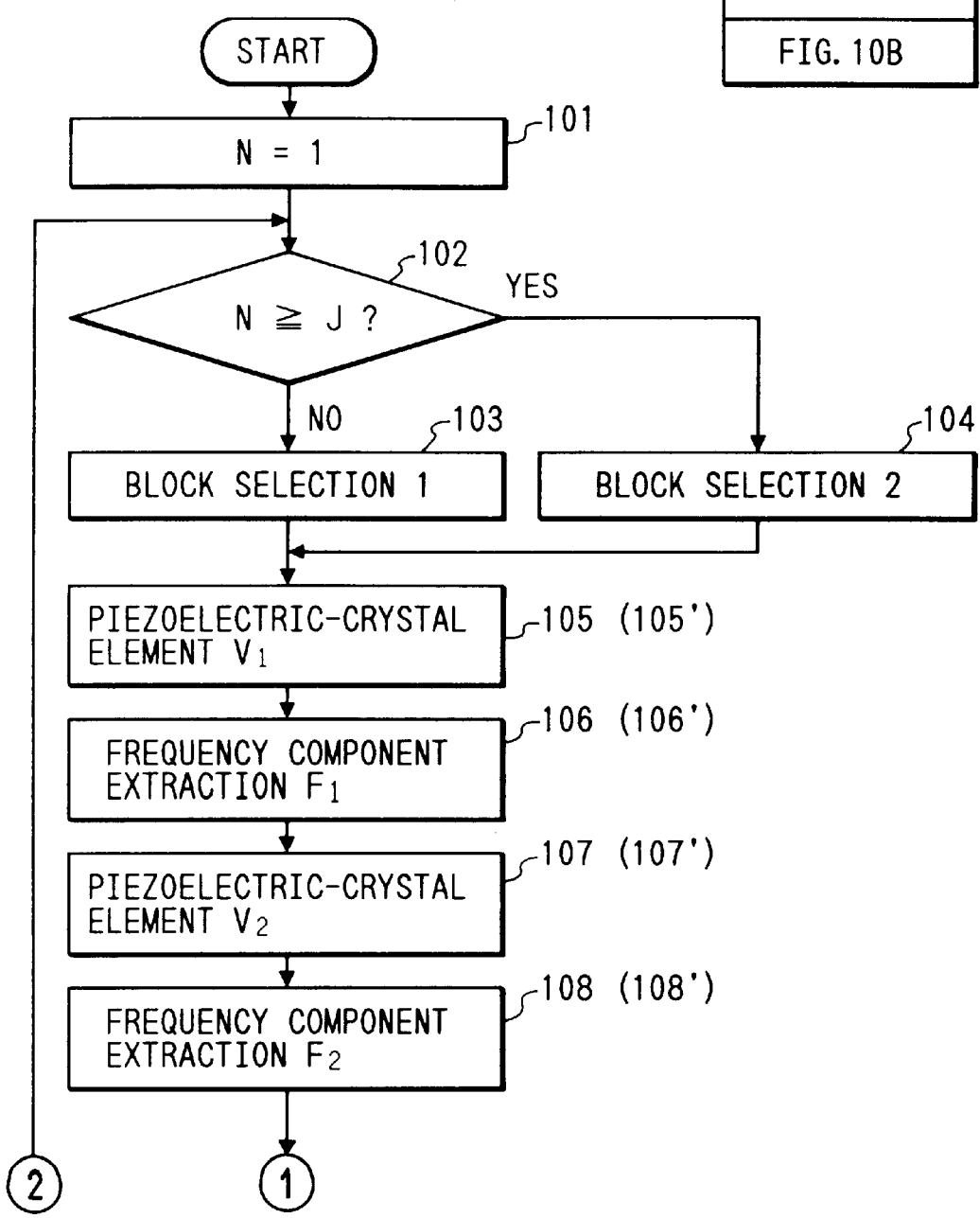

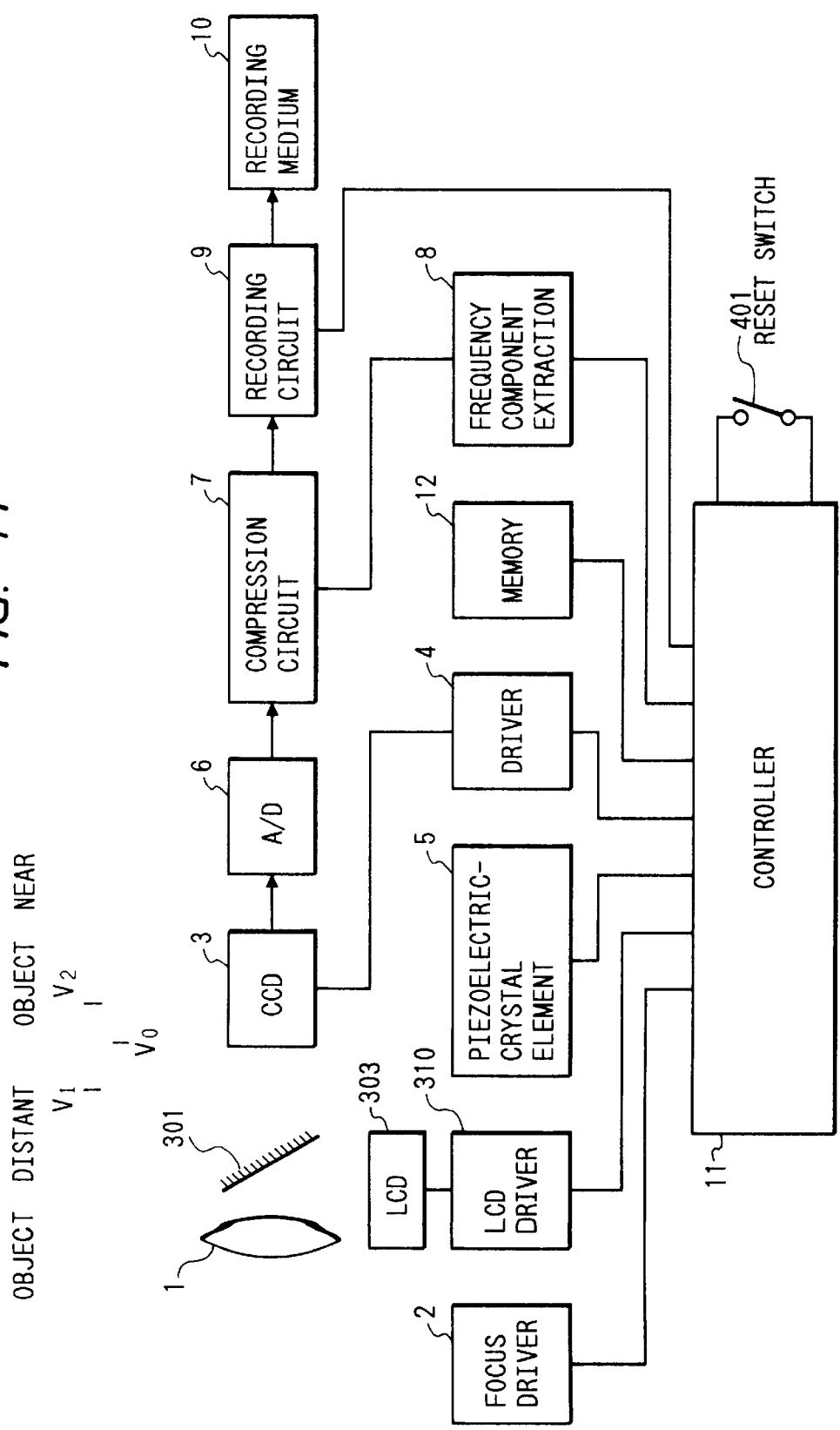

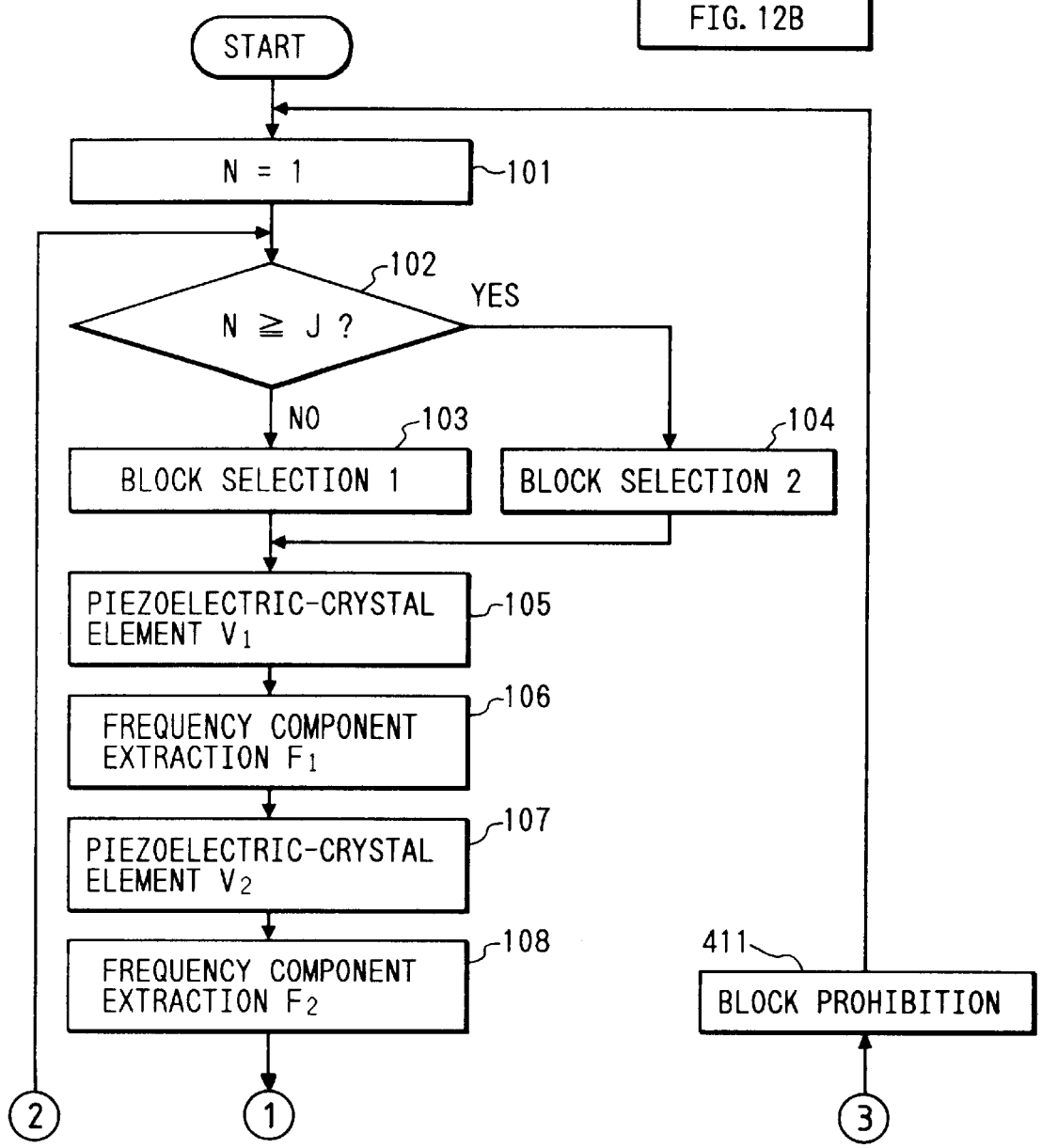

IMAGE PICKUP DEVICE

This application is a continuation of application Ser. No. 07/787,149 filed Nov. 4, 1991, now abandoned.

BACKGROUND OF THE INVENTION

1. Field of the Invention

The present invention relates to an image pickup device, and more particularly to focusing based on frequency analysis of image information.

2. Related Background Art

Image pickup device, employing an image sensor and adapted for use in a video camera or the like, is usually equipped with an automatic focusing device for achieving focusing of an object. Among known auto focusing device is one utilizing the signal from the image sensor to effect control by a circuit separate from the signal processing circuit for forming a video signal or the like, and for analyzing the frequency of the image signal and focusing the lens so as to maximize the high frequency components.

On the other hand, digital processing of the image (video) signal has become popular in recent years.

The digitized video signal has an advantage that the image quality is not deteriorated even after repeated electromagnetic conversion (recording and reproduction), but mere digitization of the video signal results in an enormous amount of information. In the conventional image pickup device, therefore, signal compression is conducted, utilizing the redundancy of the video signal, in order to reduce the required memory capacity or the signal transfer time.

There are already known various methods for such signal compression, but DCT (discrete cosine transformation, utilizing the real part of high-speed Fourier conversion) is increasingly utilized, also in consideration of ease of hardware preparation.

The DCT involves spatial frequency analysis of the image, namely evaluation of the image sharpness.

Because of the situations explained above, the conventional image pickup device with automatic focusing function and digital signal processing function has to be provided with an automatic focusing circuit and a circuit for digital signal processing such as A/D converter, compression circuit etc.

However, if digital processing of image signal is intended in such conventional image pickup device, there are required, separately, a circuit for automatic focusing and a circuit for such digital signal processing, so that the magnitude of circuitry becomes inevitably large, leading to a larger dimension or a higher cost of the video camera etc. Also an increased magnitude of circuitry increases the power consumption, thus leading to a shorter time of operation in an equipment such as video camera, which is frequently used outdoors with a battery.

SUMMARY OF THE INVENTION

In consideration of the foregoing drawbacks of the prior art, the object of the present invention is to provide an image pickup device capable of automatic focusing function and digital signal processing function and still having a limited magnitude of circuitry and a small power consumption.

The above-mentioned object can be attained, according to an embodiment of the present invention, by an image pickup device comprising a phototaking optical system for guiding the light from an object to a photosensor; a dividing unit for dividing the image information from said photosensor into plural blocks; a discrimination unit for identifying, among the blocks divided by said dividing unit, a block rich in high-frequency components; a detection unit for detecting focus information relating to the focus of said phototaking optical system, based on the frequency information relating to the frequency components of the block identified by said discrimination unit; and a driving unit for driving said phototaking optical system according to said focus information.

Other objects and advantages of the present invention will become apparent from the detailed description to follow and to be taken in conjunction with the appended claims.

BRIEF DESCRIPTION OF THE DRAWINGS

FIG. 3 is a view showing an embodiment of signal reading method from the image sensor;

FIG. 11 is a block diagram of the image pickup device of a fifth embodiment;

DESCRIPTION OF THE PREFERRED EMBODIMENTS

Now the present invention will be clarified in detail by preferred embodiments thereof shown in the attached drawings.

Figure 1:
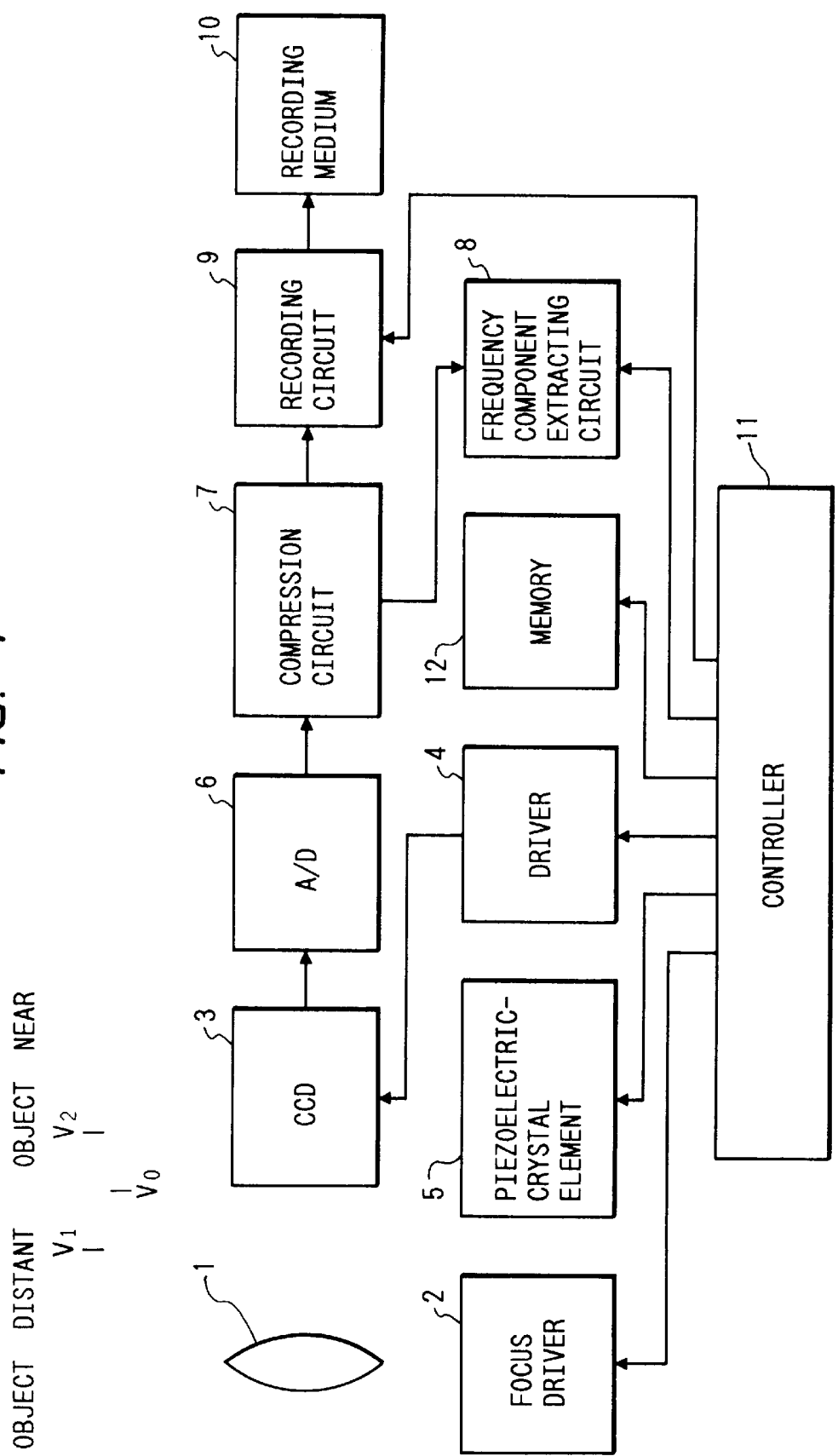
FIG. 1 is a block diagram of an image pickup device constituting a first embodiment.

FIG. 1 is a block diagram of an image pickup device constituting a first embodiment, in which there is shown an optical system for forming an optical image of an object on an image sensor to be explained later; a focus driver 2 for electrically driving a focusing unit of the optical system 1; an image sensor 3 composed of a CCD (charge-coupled device), a MOS (metal oxide semiconductor) sensor or an image sensor tube; and a driver 4 for driving the image sensor for reading signals therefrom.

A piezoelectric element 5 is provided for axially displacing the image sensor 3. Under the application of a voltage V0 to said piezoelectric element 5, the image sensor 3 is in an image taking position. Under the application of a voltage V1, the image sensor 3 is positioned forward (corresponding to a focus position for a farther object), and, under the application of a voltage V2, the image sensor 3 moves rearwards (corresponding to a focus position for a closer object).

The voltages V1 and V2 are so selected as to provide a same amount of image blur when the lens is in focus at the voltage V0.

There are also shown an A/D (analog-digital) converter 6 for converting the optical information (analog signal) of the object image obtained from the image sensor 3; an image information compression circuit 7 utilizing transformation such as DCT; a frequency component extracting circuit 8 for extracting frequency components (for example Fourier coefficients) obtained in the compression circuit 7; and a recording circuit 9 for recording the object image information, compressed in the compression circuit 7, on an IC card 10 constituting a recording medium, which may also be replaced by an optical disk or a rigid disk.

Also shown is a controller 11 for controlling the entire image pickup device; and a memory 12 for storing the coordinate of a block rich in high frequency components, utilized in the operation of the compression circuit 7 in the block unit, as will be explained later.

In the following the function of the image pickup device of the above-explained first embodiment will be explained with reference to a flow chart shown in FIG. 2.

Figure 2B:
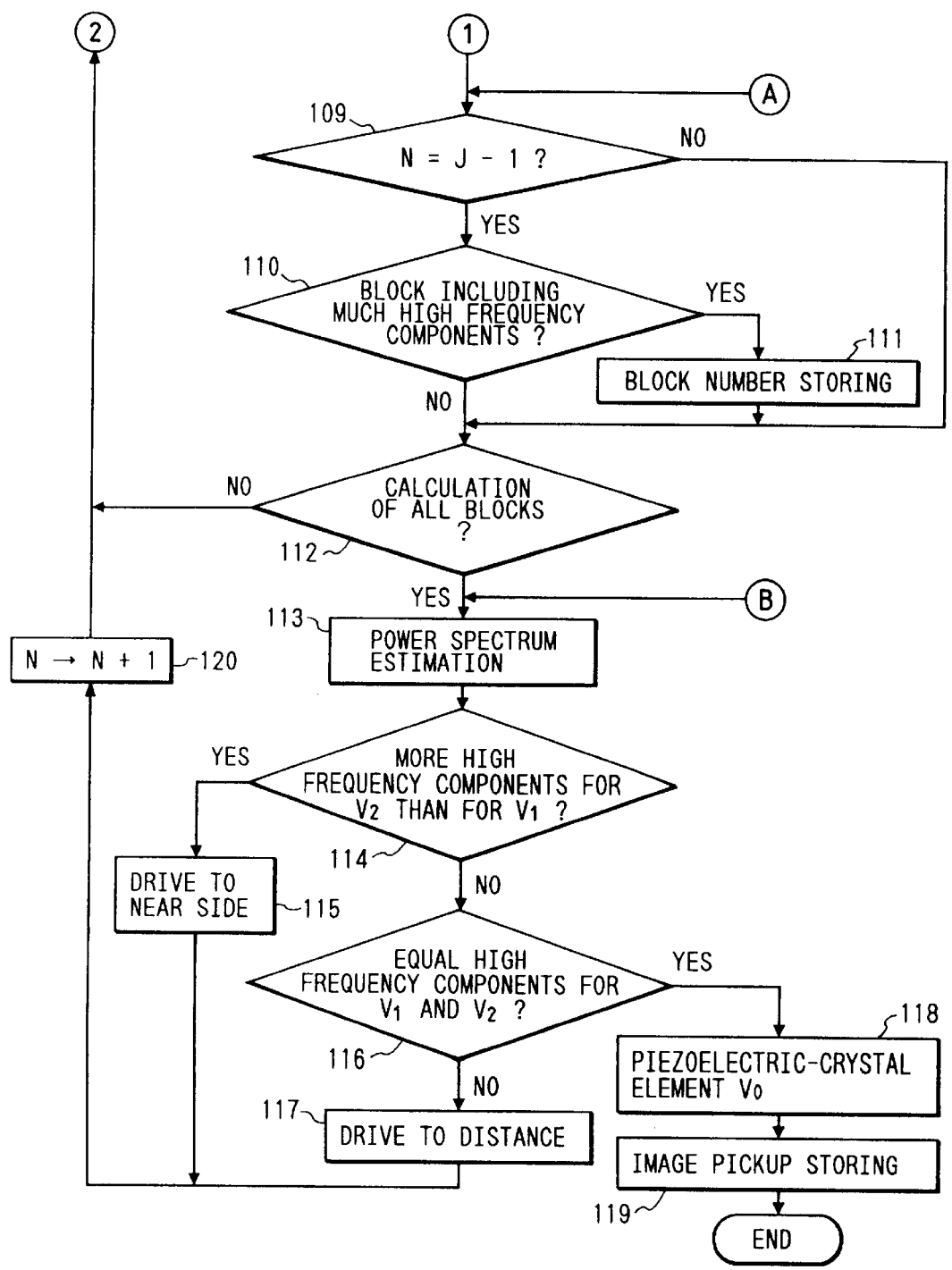
FIG. 2 is a flow chart showing the function of the image pickup device of the first embodiment.

FIG. 2 show the flow chart of the function of the image pickup device of the first embodiment.

Figure 3:
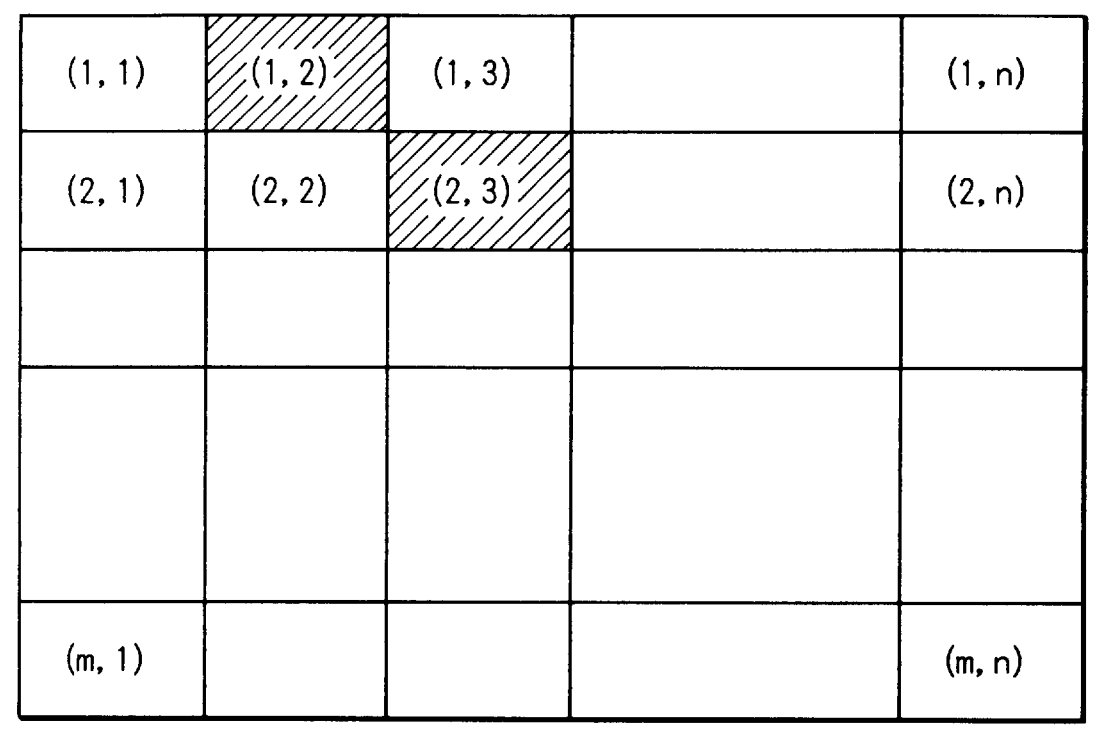

The image frame of the image sensor 3 is divided, as shown in FIG. 3, into m×n blocks, for example of 8×8 pixels each, and each of said blocks is subjected to compression by the compression circuit 7 at the image taking operation.

Such compression is conducted for example in the order of blocks (1, 1), (1, 2), (1, 3), . . . , (1, n), (2, 1), (2, 2), . . . , (2, n), . . . , (m, 1), (m, 2), . . . , (m, n).

On the other hand, in the focusing operation, the division into blocks is conducted in a similar manner, and each of said blocks is subjected to frequency analysis but not the compression.

In the course of frequency analysis, blocks rich in high frequency components are looked for (for example the hatched blocks in FIG. 3 such as (1, 2), (2, 3), . . . ) and the coordinates of such blocks are stored in the memory 12. After a certain number of cycles, the frequency analysis is conducted only on such blocks.

In the following the function of the circuit shown in FIG. 1 will be explained in more detail with reference to FIG. 2.

At first a number "1" is given to a parameter N, indicating the number of cycles of frequency analysis on the image of the image sensor 3, divided in blocks as shown in FIG. 3 (step 101 in FIG. 2). Then there is discriminated whether the parameter N is at least equal to a predetermined value J (step 102). If N is less than J (branch NO in step 102), the frequency analysis is conducted on the blocks in the order (1, 1), (1, 2), . . . , (1, n), (2, 1), (2, 2), . . . (2, n), . . . , (m, 1), (m, 2), . . . , (m, n) (step 103). Thus, at first, the frequency analysis is conducted on the block (1, 1).

A voltage V1 is applied from the controller 11 to the piezoelectric element 5 (step 105), and the A/D converter 6 is activated for the pixels, corresponding to the block (1, 1), of the image sensor 3, thereby entering the obtained digital data into the compression circuit 7 for effecting frequency transformation. Then the components of thus obtained spatial frequencies are extracted by the extracting circuit 8 (step 106). Then a voltage V2 is applied from the controller 11 to the piezoelectric element 5 (step 107) and the A/D converter 6 is activated to the pixels corresponding to the block 1, 1) of the image sensor 3, thereby entering the corresponding digital data into the compression circuit 7 for frequency transformation. Then the components of thus obtained spatial frequencies are extracted by the extracting circuit 8 (step 108). Then it is determined whether N is equal to J–1 (step 109). If not (branch NO in step 109), it is determined whether the process of the steps 105–108 have been conducted on all the blocks (step 112). Since the block (1, 1) only has been processed in the present situation, the determination in the step 112 turns out negative. Consequently the sequence returns to the step 102 according to the flow chart (FIG. 2), and, since N=1, the determination in step 102 turns out negative as before Because the block (1, 1) was selected in the preceding cycle, the block selecting step 103 selects a block (1, 2), which is then subjected to the above-explained process of the steps 105–112. Subsequently the same process loop is repeated for the blocks (1, 3), . . . , (1, n), (2, 1), . . . , (2, n), . . . , (m, 1), . . . , (m, n). The process for all the blocks being completed at the block (m, n), the step 112 provides the affirmative discrimination, whereupon the sequence proceeds to a step 113. When N is smaller than J, the step 113 determines:

$$F = \sum_{k+l>9}\left(\sum_{i=1}^{m}\sum_{j=1}^{n}|a_{kl}(ij)|\right) \Big/ \sum_{k+l<7}\left(\sum_{i=1}^{m}\sum_{j=1}^{n}|a_{kl}(ij)|\right) \quad (1)$$

for spatial components of each block:

$$\begin{pmatrix} a_{11}(ij) & a_{12}(ij) & \ldots & a_{18}(ij) \\ \vdots & \vdots & & \vdots \\ a_{81}(ij) & a_{82}(ij) & \ldots & a_{88}(ij) \end{pmatrix}$$

wherein $a_{11}(ij)$: DC component $a_{88}(ij)$: high-frequency component as an evaluation function. It is noted that the block contains a larger amount of high frequency components as said evaluation function becomes larger.

Then the value F obtained by the application of the voltage V1 to the piezoelectric element 5 is compared with the value F obtained by the application of the voltage V2 (step 114), and if the latter is larger (branch YES in step 114), the object is identified to be positioned closer than the current focus position. Thus the controller 11 drives the focus driver 2 to move the focus position to the nearer side by a predetermined amount (step 115). On the other hand, if the step 114 identifies that the value F corresponding to the voltage V2 is not larger than that corresponding to the voltage V1 (branch NO in step 114) it is discriminated whether both values F are mutually equal (step 116). If not (branch NO in step 116), the value F corresponding to the voltage V1 is larger, indicating that the object is positioned farther than the current focus position, so that the controller 11 drives the focus driver 2 to move the focus position to the farther side by a predetermined amount (step 117). Thus the steps 115 and 117 effect a focusing operation toward the in-focus position from the current focus position, as the frequency analysis indicates that the lens is not yet focused to the object.

Then the value of the parameter N is increased by "1" (step 120) and the sequence returns to the step 102 for repeating the above-explained process (after loops of steps 102→103→105→106→107→108 →109→112→102, steps 113→114→115 (→113→116 →117)→120→102).

In the repetition of this cycle, the step 109 provides the affirmative result when N becomes equal to J−1, whereupon the sequence proceeds to a step 110 for discriminating whether each block contains a large amount of high-frequency components. Said discrimination is made if:

$$F(ij) = \frac{\sum_{k+l>9} |a_{kl}(ij)|}{\sum_{k+l<7} |a_{kl}(ij)|} \quad (2)$$

based on the results of frequency analysis:

$$\begin{pmatrix} a_{11}(ij) & a_{12}(ij) & \ldots & a_{18}(ij) \\ \vdots & \vdots & & \vdots \\ a_{81}(ij) & a_{82}(ij) & \ldots & a_{88}(ij) \end{pmatrix}$$

is larger than a certain threshold value $F_0$.

In case of:

$$F(ij) > F_0 \quad (3)$$

(branch YES in step 110), the block (i, j) contains a large amount of high-frequency components, so that the controller 11 stores the address of said block (i, j) in the memory 12 (step 111) and the sequence proceeds to a next step 112. On the other hand, in case of:

$$F(ij) \leq F_0 \quad (4)$$

(branch NO in step 110), the sequence directly proceeds to the step 112.

When the calculation is completed for all the blocks, the sequence proceeds to a process starting from the step 113, and, if the in-focus state is still not reached, the value of N is increased by "1" and the sequence returns to the step 102. Since N is thereafter at least equal to J, the step 102 provides the affirmative result, so that the sequence proceeds through the step 104 to the step 105. The step 104 selects only the blocks which have been identified to contain a large amount of high frequency components, in the steps 110, 111. Then the steps 105–108 effect frequency analysis, on these blocks, under the application of the voltages V1 and V2 to the piezoelectric element 5. Then, since the step 109 provides negative results, the sequence immediately jumps to the step 112. When the frequency analysis is completed for all the blocks rich in the high-frequency components by repeating the loop returning to the step 102, the step 112 provides the affirmative result whereupon the sequence proceeds to the step 113, which calculates following F when N is at least equal to J:

$$F = \frac{\sum_{k+l>9} \left( \sum_{ij} |a_{kl}(ij)| \right)}{\sum_{k+l<7} \left( \sum_{ij} |a_{kl}(ij)| \right)} \quad (5)$$

for the voltages V1, V2 to be applied to the piezoelectric element 5, and for all the blocks rich in the high-frequency components, and then the sequence proceeds to the steps 114 and 115 or 114 and 116. Through these operations the lens is gradually focused, and the value F eventually becomes equal for the voltages V1 and V2 (branch YES for step 116). As the lens is sufficiently focused in this state, the voltage $V_0$ is supplied to the piezoelectric element 5 to bring the image sensor 3 to the image position (step 118). Then the image sensor 3 is exposed, the output thereof is converted by the A/D converter 6 into digital information, which is compressed by the compression circuit 7 and recorded by the recording circuit 9 on the recording medium 10 (step 119), whereupon the sequence is terminated.

Figure 4:
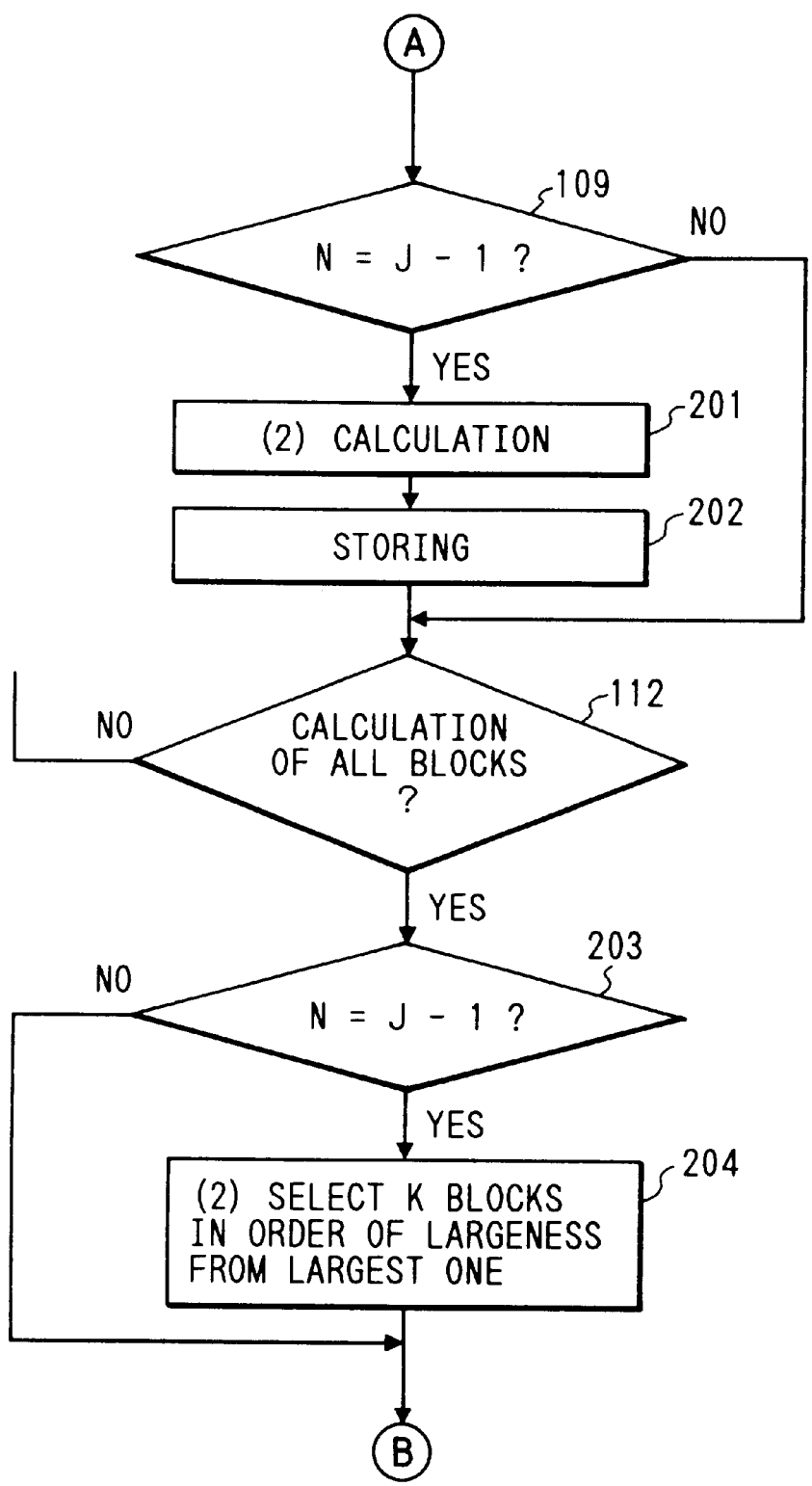
FIG. 4 is a flow chart showing a partial variation in the flow chart shown in FIG. 2.

In supplement to the foregoing explanation, the selection of blocks with a high content of the high frequency components may be conducted for a predetermined number K of blocks in the descending order of said content. This can be achieved by modifying a portion Ⓐ-Ⓑ in FIG. 2 as shown in FIG. 4, in which steps equivalent to those in FIG. 2 are represented by same step numbers. In the following there will be explained only the portion different from the sequence in FIG. 2. In the frequency analysis of N=(J−1)-th cycle (branch YES in step 109), the controller 11 calculates the evaluation function according to the equation (2) for all the blocks (step 201) and stores the result together with the block address (ij) in the memory 12 (step 202).

After the process is completed for all the blocks in this manner, the step 112 provides the affirmative result, whereupon the sequence proceeds to a step 203. Since N=J−1 in this state, the step 203 provides an affirmative result, whereupon the sequence proceeds to a step 204, in which the controller 11 compares the values of the equation (2) for different blocks, stored in the memory 12, then selects K blocks in the descending order of said value and stores the addresses (i, j) of said blocks in the memory 12. The subsequent sequence is identical with that shown in FIG. 2. In this case, since the frequency analysis is conducted only in K blocks under the condition N≧J, the energy required for an analysis is substantilly constant, regardless of the number of blocks containing the high-frequency components. In FIG. 4, the steps 201, 202 and 204 are skipped and ineffective except when N=J−1. As certain objects show the high-frequency components only in very limited areas, there may be employed a sequence utilizing the concept of FIGS. 2 and 4. More specifically, this can be achieved, in the step 204 shown in FIG. 4, by selecting K blocks or less which show the value of the equation (2) larger than the threshold value $F_0$, namely which satisfy the equation (3).

In the following there will be explained an image pickup device constituting a second embodiment of the present invention.

The structure of said second embodiment is similar to that of the first embodiment shown in FIG. 1, and will not, therefore, be explained.

Figure 5B:
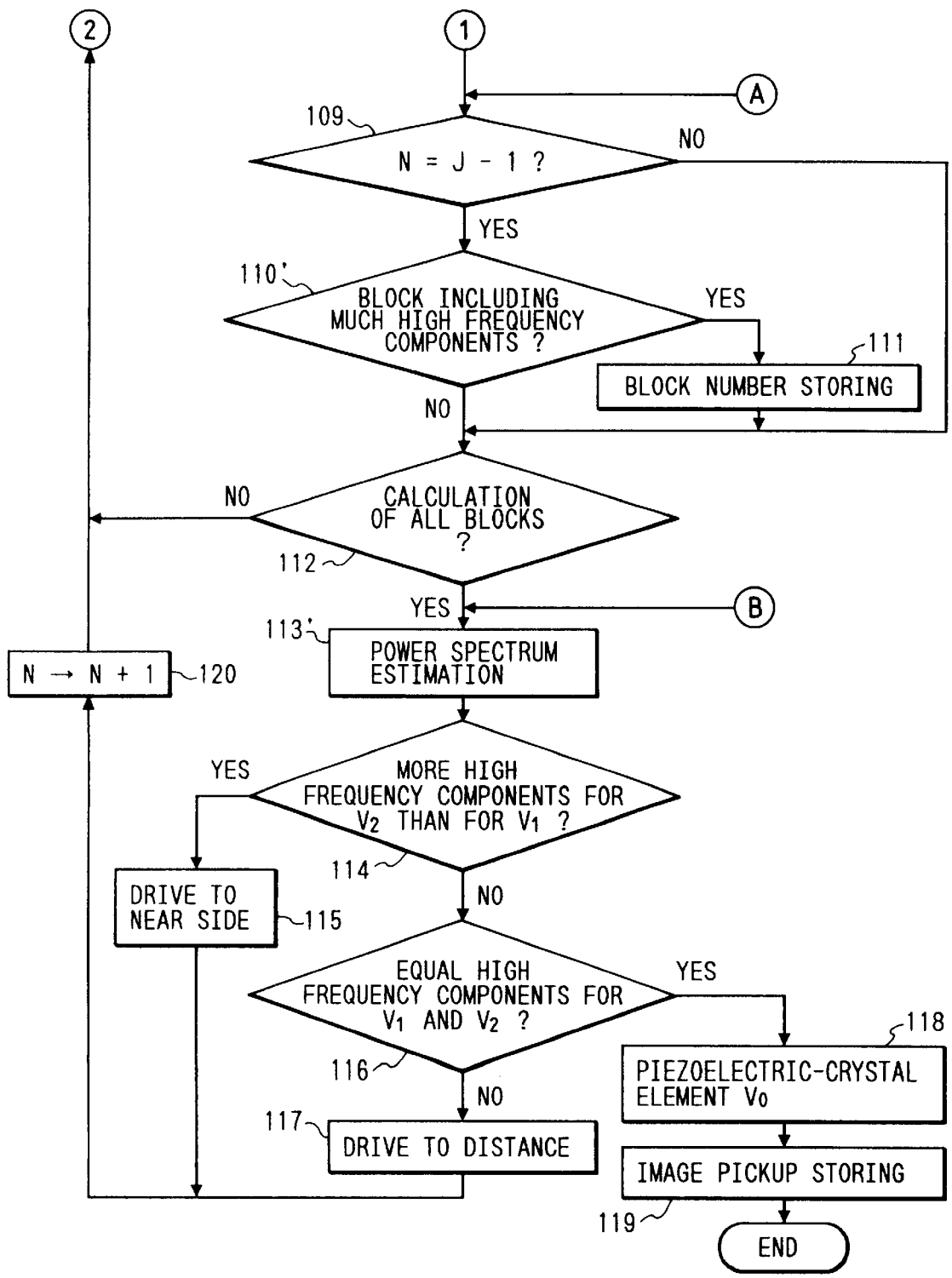
FIG. 5 is a flow chart showing the function of the image pickup device of a second embodiment.

In FIG. 5, the steps equivalent to those in FIG. 2 are represented by same step numbers as in FIG. 2.

The image frame of the image sensor 3 is divided, as already explained in the first embodiment, into m×n blocks, for example of 8×8 pixels each, and, in the image taking operation, each of said blocks is subjected to compression by the compression circuit 7 (see FIG. 3).

On the other hand, in the focusing operation, the division into blocks is conducted in a similar manner, and each of said blocks is subjected to frequency analysis but not compression.

In the following there will be given a detailed explanation on the function of the image pickup device of the present embodiment.

At first a number "1" is given to a parameter N, indicating the number of cycles of frequency analysis on the image of the image sensor 3, divided in blocks as shown in FIG. 3 (step 101 in FIG. 5). Then it is determined whether the parameter N is at least equal to a predetermined value J (step 102). If N is less than J (branch NO in step 102), the frequency analysis is conducted on the blocks in the order (1, 1), (1, 2), ..., (1, n), (2, 1), (2, 2), ..., (2, n), ..., (m, 1), (m, 2), ..., (m, n) (step 103). Thus, at first, the frequency analysis is conducted on the block (1, 1).

A voltage V1 is applied from the controller 11 to the piezoelectric element 5 (step 105) and the A/D converter 6 is activated for the pixels, corresponding to the block (1, 1), of the image sensor 3, thereby entering the obtained digital data into the compression circuit 7 for effecting frequency transformation. Then the components of thus obtained spatial frequencies are extracted by the extracting circuit 8 (step 106'). Then a voltage V2 is applied from the controller 11 to the piezoelectric element 5 (step 107') and the A/D converter 6 is activated to the pixels corresponding to the block (1, 1) of the image sensor 3, thereby entering the corresponding digital data into the compression circuit 7 for frequency transformation. Then the components of thus obtained spatial frequencies are extracted by the extracting circuit 8 (step 108'). Then there is discriminated whether N is equal to J−1 (step 109). If not (branch NO in step 109) it is determined whether the process of the steps 105–108 have been conducted on all the blocks (step 112). Since the block (1, 1) only has been processed in the present situation, the determined in the step 112 turns out negative. Consequently the sequence returns to the step 102 according to the flow chart (FIG. 5), and, since N=1, the step 102 turns out negative as beofore. Because the block (1, 1) was selected in the preceding cycle, the block selecting step 103 selects a block (1, 2), which is then subjected to the above-explained process of the steps 105–112. Subsequently the same process loop is repeated for the blocks (1, 3), ..., (1, n), (2, 1), ..., (2, n), ..., (m, 1), ..., (m, n). The process for all the blocks being completed at the block (m, n), the step 112 provides the affirmative determination, whereupon the sequence proceeds to a step 113'. When N is smaller than J, the step 113' determines:

$$F = \sum_{k \geq 4} \sum_{l \geq 4} \left( \sum_{i=1}^{m} \sum_{j=1}^{n} |a_{kl}(ij)| \right) / \sum_{i=1}^{m} \sum_{j=1}^{n} |a_{11}(ij)| \quad (6)$$

for spatial components of each block:

$$\begin{pmatrix} a_{11}(ij) & a_{12}(ij) & \cdots & a_{18}(ij) \\ \vdots & \vdots & & \vdots \\ a_{81}(ij) & a_{82}(ij) & \cdots & a_{88}(ij) \end{pmatrix}$$

wherein $a_{11}(ij)$: DC component
$a_{88}(ij)$: high-frequency component as an evaluation function. It is noted that the block contains a larger amount of high frequency components as said evaluation function becomes larger.

Then said value F obtained by the application of the voltage V1 to the piezoelectric element 5 is compared with the value F obtained by the application of the voltage V2 (step 114), and if the latter is larger (branch YES in step 114), the object is identified to be positioned closer than the current focus position. Thus the controller 11 drives the focus driver 2 to move the focus position to the nearer side by a predetermined amount (step 115). On the other hand, if the step 114 identifies that the value F corresponding to the voltage V2 is not larger than that corresponding to the voltage V1 (branch NO in step 114), it is determined whether both values F are mutually equal (step 116). If not (branch NO in step 116), the value F corresponding to the voltage V1 is larger, indicating that the object is positioned farther than the current focus position, so that the controller 11 drives the focus driver 2 to move the focus position to the farther side by a predetermined amount (step 117). Thus the steps determined amount (step 117). Thus the steps 115 and 117 effect a focusing operation toward the in-focus operation from the current focus position, as the frequency analysis indicates that the lens is not yet focused to the object.

Then the value of the parameter N is increased by "1" (step 120), and the sequence returns to the step 102 for repeating the above-explained process (after loops of steps 102→103→105→106→107→108→109→112→102, steps 113→114→115 (→113→116→117)→120→102).

In the repetition of this cycle, the step 109 provides the affirmative result when N becomes equal to J−1, whereupon the sequence proceeds to a step 110' for determining whether each block contains a large amount of high-frequency components. This determination can be made by calculating, for example:

$$F^1(i, j) = \sum_{k=4}^{8} (|a_{lk}(i, j)|)/|a_{11}(i, j)| \quad (7.1)$$

$$F^2(i, j) = \sum_{k=4}^{8} (|a_{kl}(i, j)|)/|a_{11}(i, j)| \quad (7.2)$$

$$F^3(i, j) = \sum_{k=4}^{8} (|a_{kk}(i, j)|)/|a_{11}(i, j)| \quad (7.3)$$

$$F^4(i, j) = \sum_{k=2}^{8} |a_{kk+l}(i, j) + a_{k+lk}(i, j)| \quad (7.4)$$

based on the results of frequency analysis:

$$\begin{bmatrix} a_{11}(ij) & a_{12}(ij) & \cdots & a_{18}(ij) \\ \vdots & \vdots & & \vdots \\ a_{81}(ij) & a_{82}(ij) & \cdots & a_{88}(ij) \end{bmatrix}$$

and identifying the largest among $F^1(i, j)$, $F^2(i, j)$ and $F^3(i, j)$. There is identified:
  a vertical edge: if $F^1(i, j)$ is largest;
  a horizontal edge: if $F^2(i, j)$ is largest;
  a diagonal edge: if $F^3(i, j)$ is largest:
If said largest value exceeds a predetermined threshold value $F_{01}$, namely if $MAX(F^1(i, j), F^2(i, j), F^3(i, j)) > F_{01}$ (8.1) (branch YES in step 110'), this block (i, j) has a high content of the high-frequency components, so that the controller 11 stores the block address (i, j) and the direction of maximum in the memory 12 (step 111). Then the sequence proceeds to the next step 112.

The vertical or horizontal edge can be determined without ambiguity, but a diagonal edge has to be identified whether it runs from lower left to upper right, or from lower right to upper left. The two-dimensional DCT coefficients have the following property:

for an edge running to upper right:

$$a_{i\ i+1} \tilde{=} a_{i+1\ i} (i=1-7) \quad (9.1)$$

for an edge running to upper left:

$$a_{i\ i+1} \tilde{=} -a_{i+1\ i} (i=1-7), \quad (9.2)$$

Therefore an edges running to upper right or to upper left are identified respectively if:

$$F^3(i, j) > F_{02} \quad (8.2)$$

is satisfied or note when $F^3(i, j)$ is largest among $F^1(i, j)$ $F^2(i, j)$ and $F^3(i, j)$.

In case of:

$$MAX(F^1(i, j), F^2(i, j), F^3(i, j)) < F_{01} \quad (8.3)$$

the block (i, j) does not have a high content of the high-frequency components (branch NO in step 110'), so that the sequence immediately proceeds to the step 112.

When the calculation is completed for all the blocks, the sequence proceeds to a process starting from the step 113, and, if the in-focus state is still not reached, the value of N is increased by "1" and the sequence returns to the step 102. Since N is thereafter at least equal to J, the step 102 provides the affirmative result, so that the sequence proceeds through the step 104 to the step 105. The step 104 selects only the blocks which have been identified, in the steps 110 and 111, to have a high content of the high frequency components. Then steps 105'–108' effect, when N becomes at least equal to J, one-dimensional frequency analysis in a direction perpendicular to the edge, on these blocks, under the application of the voltages V1 and V2 to the piezoelectric element 5, and determine a spectrum:

[$a_1(i, j)$ $a_2(i, j)$ . . . $a_8(i, j)$].

Then, since the step 109 provides negative result "NO" because of $N \geq 1$, the sequence immediately jumps to the step 112. When the frequency analysis is completed for all the blocks rich in the high-frequency components by repeating the loop returning to the step 102, the step 112 provides the affirmative result whereupon the sequence proceeds to the step 113' which calculates as follows, when N is greater than or equal to J:

$$F = \frac{\sum_{k=4}^{8} |a_k(i, j)|}{|a_1(i, j)|} \quad (10)$$

for the voltages V1, V2 to be applied to the piezoelectric element 5, and for all the blocks rich in the high-frequency components. Then the sequence proceeds to the steps 114 and 115 or 114 and 116. Through these operations the lens is gradually focused, and the value F eventually becomes equal for the voltages V1 and V2 (branch YES for step 116). As the lens is sufficiently focused in this state, the voltage $V_0$ is supplied to the piezoelectric element 5 to bring the image sensor 3 to the image position (step 118). Then the image sensor 3 is exposed, the output thereof is converted by the A/D converter 6 into digital information, which is compressed by the compression circuit 7 and recorded by the recording circuit 9 on the recording medium 10 (step 119), whereupon the sequence is terminated.

Figure 6:
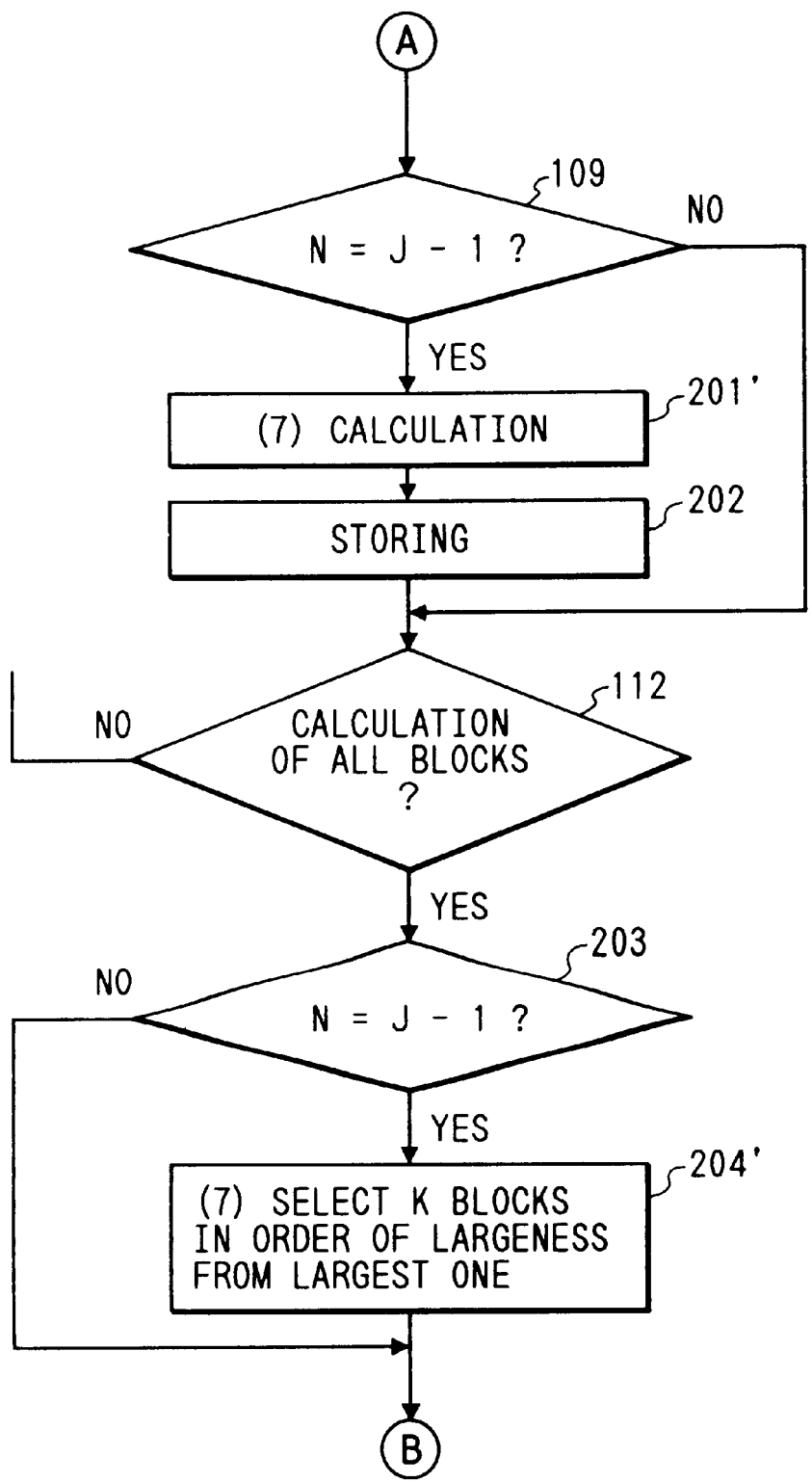
FIG. 6 is a flow chart showing a partial variation in the flow chart shown in FIG. 5.
Figure 7A:
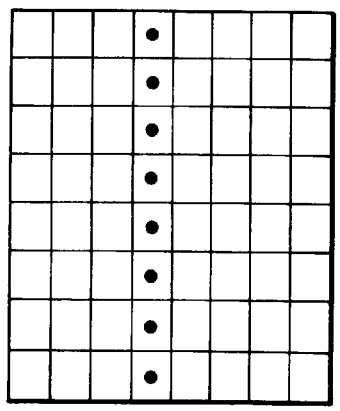
FIGS. 7A to 7D are views showing the concept of a third embodiment.
Figure 7B:
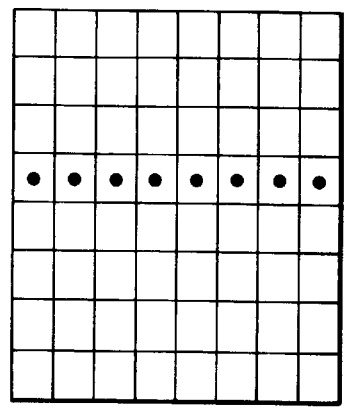
Figure 7C:
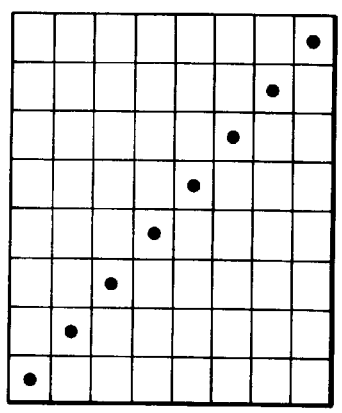
Figure 7D:
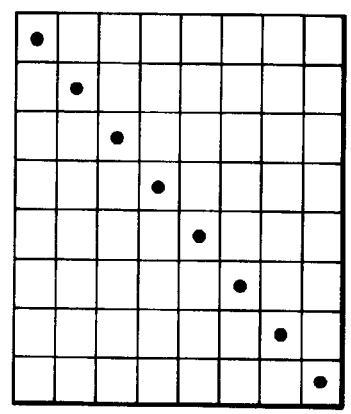

In supplement to the foregoing explanation, the selection of blocks with a high content of the high frequency components may be conducted for a predetermined number K of blocks in a descending order of high frequency content. This can be achieved by modifying a portion Ⓐ-Ⓑ in FIG. 5 as shown in FIG. 6, in which steps equivalent to those in FIG. 4 or 5 are represented by same step numbers in FIG. 4 or 5. In the following there will be explained only the portion different from the sequence in FIG. 5. In the frequency analysis of N=(j-1)-th cycle (branch YES in step 109), the controller 11 calculates the evaluation function according to the equations (7.1) to (7.4) for all the blocks (step 201') and stores the result together with the block address (ij) in the memory 12 (step 202).

After the process is completed for all the blocks in this manner, the step 112 provides the affirmative results, whereupon the sequence proceeds to a step 203. Since N=J-1 in this state, the step 203 provides an affirmative result, whereupon the sequence proceeds to a step 204', in which the controller 11 compares the values of the equation (2) for different blocks, stored in the memory 12, then selects K blocks in the descending order of said value and stores the addresses (i, j) of said blocks in the memory 12. The subsequent sequence is identical with that shown in FIG. 5. In this case, since the frequency analysis is conducted only in K blocks under the condition $N \geq J$, the energy required for an analysis is substantially constant, regardless of the number of blocks containing the high-frequency components. In FIG. 6, the steps 201', 202 and 204' are skipped and ineffective except when N=J-1. As certain objects show the high-frequency components only in very limited areas, there may be employed a sequence utilizing the concept of FIGS. 5 and 6. More specifically, this can be achieved, in the step 204' produce in FIG. 6, by selecting K blocks or less which show a value for the equations (7.1)–(7.3) larger than the threshold value $F_0$, namely which satisfy the equation (8.1).

In the following there will be explained a third embodiment of the present invention, which identifies the blocks of high content of high-frequency components by another method.

In this embodiment, one-dimensional frequency analyses are conducted in the vertical, horizontal, diagonal (running to upper right) and diagonal (running to upper left) directions as shown in FIGS. 7A–7D with respective results:

$$[a_k^{(a)}(i, j)]k=1, 2, \ldots, 8 \quad (11.1)$$

$$[a_k^{(b)}(i, j)]k=1, 2, \ldots, 8 \quad (11.2)$$

$$[a_k^{(c)}(i, j)]k=1, 2, \ldots, 8 \quad (11.3)$$

$$[a_k^{(d)}(i, j)]k=1, 2, \ldots, 8 \quad (11.4).$$

Then following functions are calculated:

$$F^l(i, j) = \frac{\sum_{k=4}^{8} |a^{(l_k)}(i, j)|}{|a^{(l_1)}(i, j)|} \quad l = a, b, c, d \quad (12)$$

and a block with a high content of high-frequency components is identified by the following condition:

$$MAX(F^{(a)}(i,j), F^{(b)}(i,j), F^{(c)}(i,j), F^{(d)}(i,j)) > F_{01} \quad (13).$$

Also the direction of edge is identified by the largest of:
$F^{(l)}$ (l=a, b, c, d).

In the following there will be explained an image pickup device constituting a fourth embodiment of the present invention, relating to display in the view finder at the focusing operations.

Figure 8:
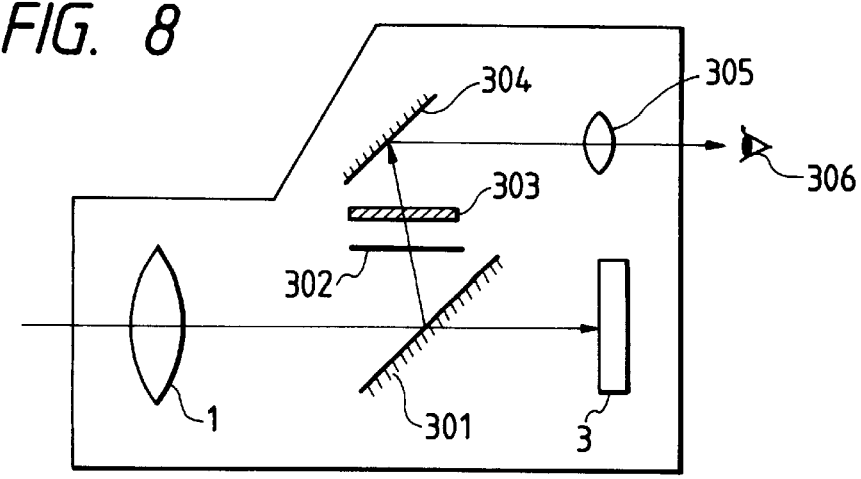
FIG. 8 is a schematic view of an optical system of a fourth embodiment.

FIG. 8 illustrates the fourth embodiment of which optical system corresponds to that in the first to third embodiments. In FIG. 8, the same components as those in FIG. 1 are represented by same numbers and will not be explained further.

The image pickup device of the present embodiment has a TTL (through the taking lens) finder as shown in FIG. 8, in which the light coming from the object is guided through a lens 1 and a beam splitter 301, and a part of said light transmitted by said beam splitter is focused on the image sensor 3.

Another part of said light, reflected by said beam splitter 301 is also focused on a finder screen 302 at an optically equivalent position to the image sensor 3.

There are also provided a liquid crystal device 303 with controllable transmittance for each of areas divided corresponding to the blocks of the image sensor 3 as shown in FIG. 3; and a reflective plane 304 of a pentagonal prism, which converts an image on the finder screen, inverted in the vertical and horizontal directions, into a proper erect image for observation by an eye 306 of the operator through an eyepiece lens 305.

Figure 9:
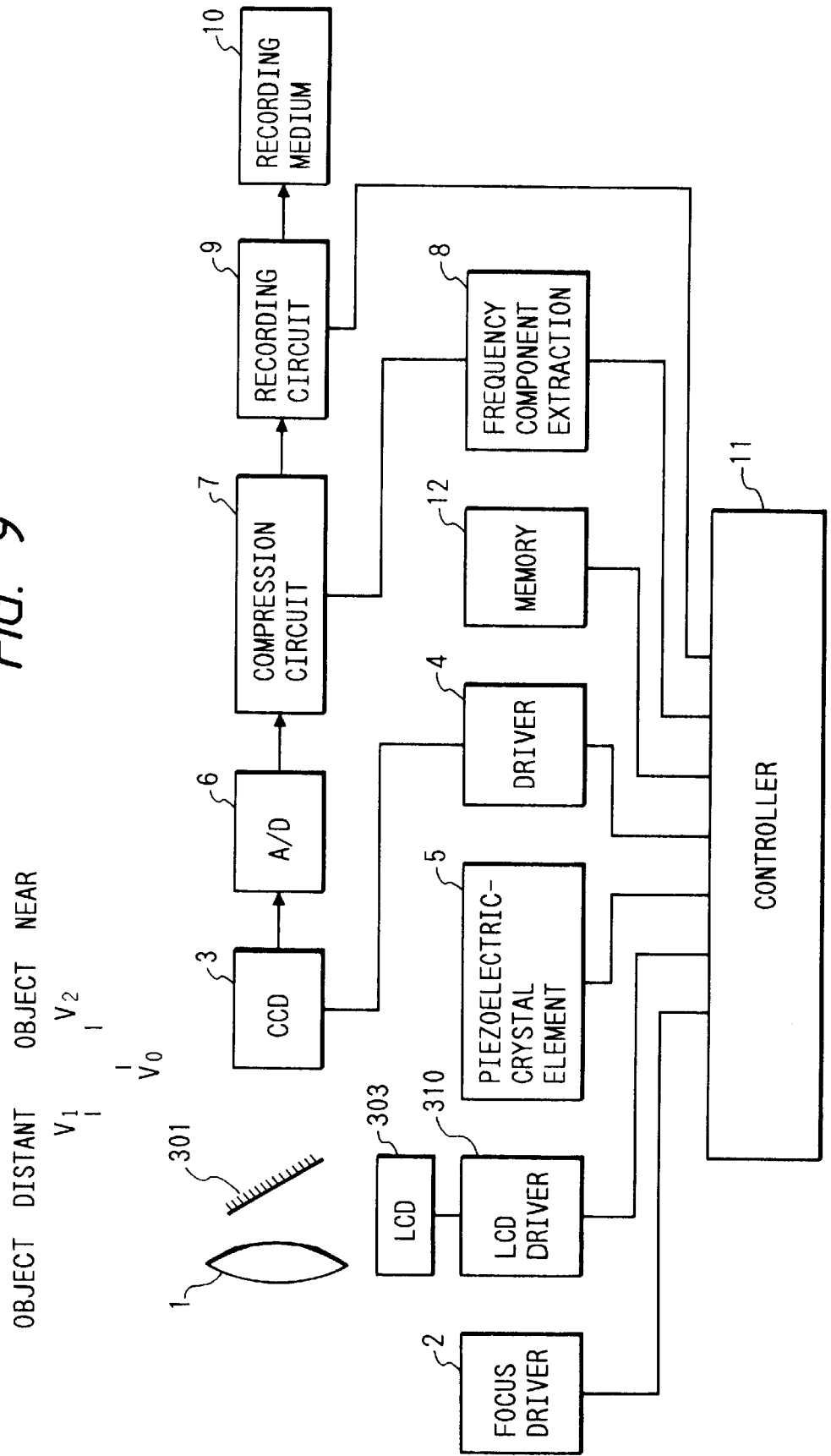
FIG. 9 is a block diagram of the image pickup device of the fourth embodiment.

FIG. 9 is a block diagram of the image pickup device of the fourth embodiment, in which same components as those in FIG. 1 are represented by same numbers and will not be explained further.

Said image pickup device of the fourth embodiment is provided with a liquid crystal driver 310, for driving the liquid crystal device 303 through the controller 11.

Figure 10B:
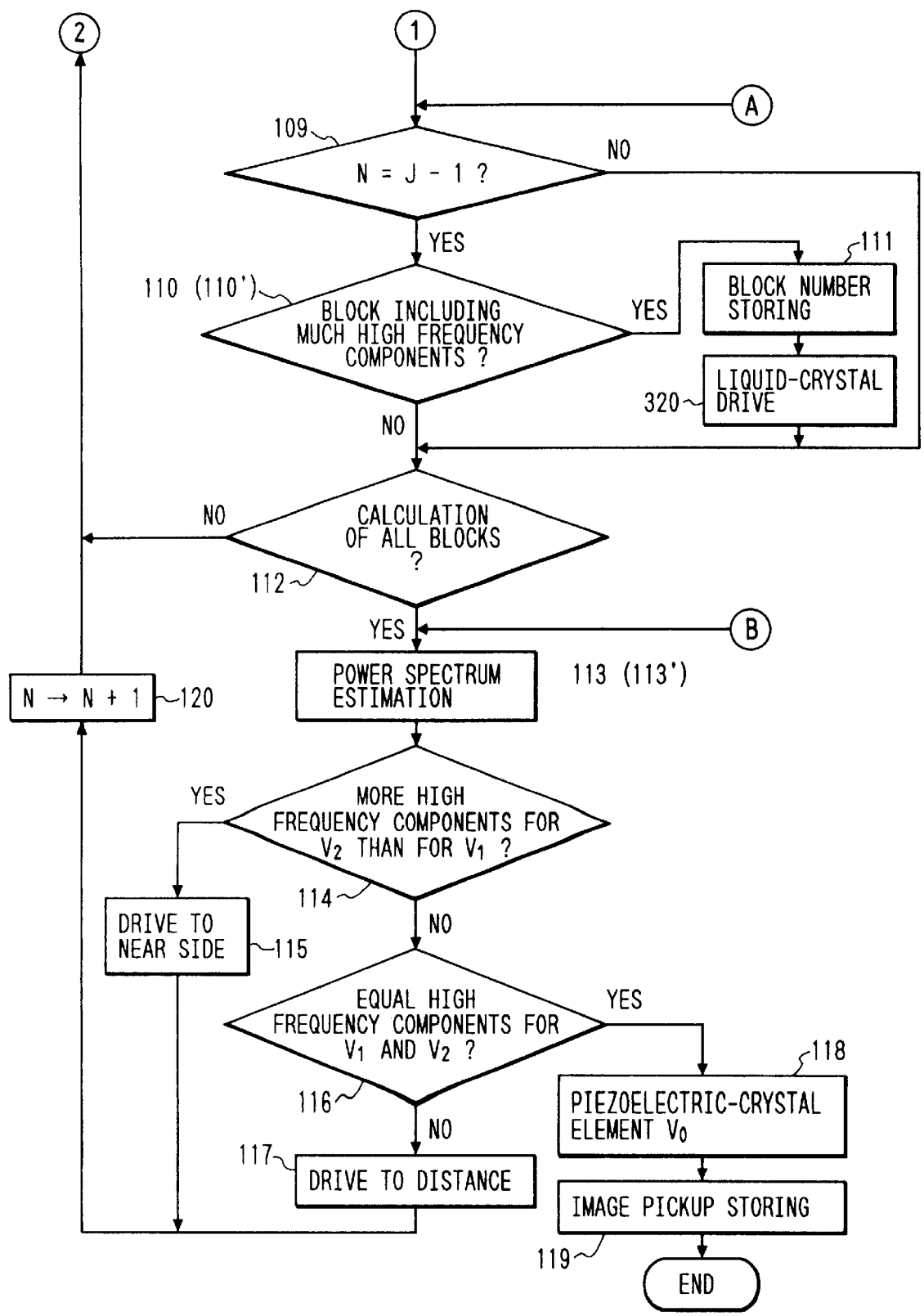
FIG. 10 is a flow chart showing the function of the image pickup device of the fourth embodiment.

What follows is an explanation of the function of the image pickup device of the fourth embodiment with reference to a flow chart shown in FIG. 10. In FIG. 10, the steps equivalent to those in FIG. 2 (or FIG. 5) are given same step numbers, and the following explanation will be devoted only to that part which is different from the sequence shown in FIG. 2 (or FIG. 5).

In fact the only difference is the presence of a step 320 after the step 111. In the extraction of blocks containing the high-frequency components in a cycle of N=J−1, if the step 110 (or 110') identifies a block containing the high-frequency components (branch YES in step 110 or 110'), the step 111 stores the address (i, j) of said block in the memory 12, and the step 320 causes the controller 11 to drive a liquid crystal area corresponding to the address (i, j) through the driver 310, thereby varying the transmittance of said area and informing the operator of the area of the object field in which the image pickup device intends to focus. In this manner the operator can visually confirm the area of focusing in the object field.

In a fifth embodiment, the operator can take a countermeasure if the above-explained display in the view finder is different from his intention.

FIG. 11 is a block diagram of an image pickup device of the fifth embodiment, wherein the same components as those in FIG. 9 are represented by the same numbers and will not be explained further.

The image pickup device of the fifth embodiment is featured by the presence of a reset switch 401 attached to the controller 11.

When the liquid crystal display is given in the view finder, and, if the photographer determines that the object to be focused is different from what the photographer intends to focus, he turns on the reset switch 401.

Figure 12B:
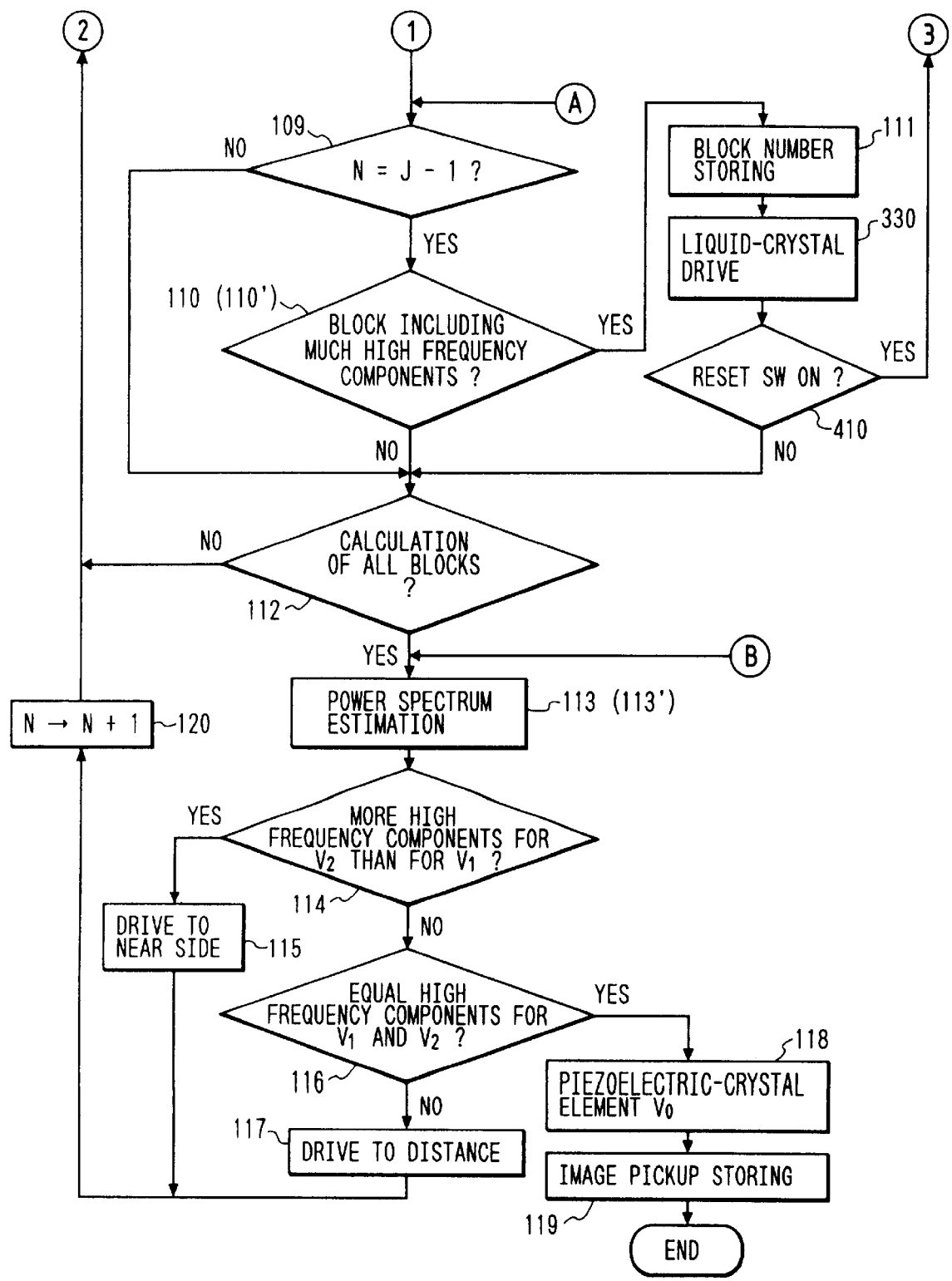
FIG. 12 is a flow chart showing the function of the image pickup device of the fifth embodiment.

The actual operations follow a flow chart shown in FIG. 12, in which the steps equivalent to those in FIG. 10 are represented by same step numbers, and the following explanation will be given only to parts different from the flowchart in FIG. 10.

After the liquid crystal display is given in the view finder in the step 330, the controller 11 determines whether the reset switch is turned on (step 410). If not branch NO (in step 410), indicating the consent of the user, is taken and the sequence proceeds to the next step.

On the other hand, if the reset switch 401 is turned on in the step 410 (branch YES), indicating that the blocks so far selected are not suitable for the purpose of focusing, all such blocks are eliminated (step 411) and the sequence is repeated anew from the step 101. In this repeated sequence, the blocks eliminated above are all excluded from the selection in the block selecting steps 103, 104. In this manner correction can be made even if the focusing is conducted on an object which is not intended by the photographer.

There will now be explained an image pickup device constituting a sixth embodiment of the present invention, applied to an electronic digital still camera.

First the image compression process will be explained.

In the compression process, the density of digitization is controlled for regulating the amount of codes in such a manner that the amount becomes substantially constant for each image.

Figure 13:
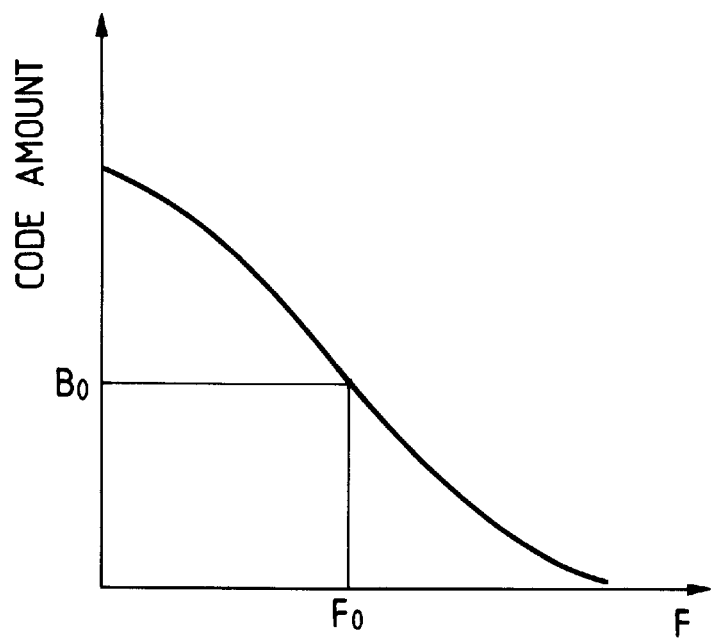
FIG. 13 is a chart showing the relationship between a digitizing factor and the amount of codes.

FIG. 13 shows the relationship between a digitizing factor F for controlling the density and the amount of codes for a given image.

Consequently, for obtaining a given amount $B_0$ of codes, the digitization has to be conducted with a digitizing factor F at $F_0$.

A method for predicting the digitizing factor $F_0$ is based on a parameter called activity. This method is based on the following fact.

If an image has a high content of areas rich in strong variations, the digitizing factor has to be increased to reduce the density of digitization, in order to obtain a given amount of codes. On the other hand, if an image has a high content of areas with weak variations the digitizing factor has to be decreased to increase the density of digitization, in order to obtain the same amount of codes.

Figure 14:
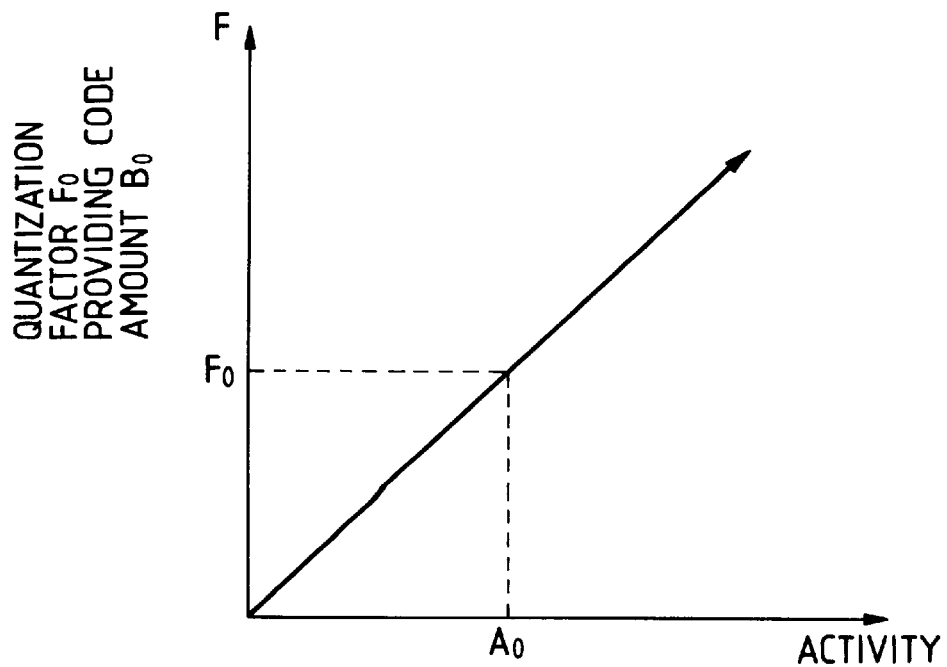
FIGS. 14 is a chart showing the relationship between an activity parameter and the digitizing factor.

Consequently the optimum digitizing factor $F_0$ for obtaining a predetermined amount of codes is approximately proportional to the activity parameter A, which is a suitably defined amount of variations in the image (cf. FIG. 14).

Naturally the desired amount $B_0$ of codes cannot necessarily be obtained only through the adjustment of such predicting factor, so that, in practice, there is also employed a method of determining the local activity in each block and regulating the bit assignment for each block according to the magnitude of such activity.

The activity parameter may assume various forms, and any parameter indicating the amount of variations in the image may be employed for this purpose.

The compression method explained above is already known in the art.

There will now be explained the configuration and function of a digital still camera constituting a sixth embodiment of the present invention, with reference to FIG. 15, which is a block diagram of the embodiment, and FIG. 16 which is a flow chart showing the function of the image pickup device of said sixth embodiment.

At first, when an unrepresented shutter release button is depressed, a lens position drive unit 520 drives a lens drive motor 521, in a step 602, to move a lens 501 to the left end position $X_L$ (shorter object distance side) in a focusing range.

The optical image, guided through the lens 501 and an optical low-pass filter 502, is photoelectrically converted in a CCD 503 into an electrical signal.

The obtained electrical signal is subjected to an analog signal processing such as KNEE process, gamma process or WB process in an analog processing unit 504, and is converted, by an A/D converter 505, into a digital signal. Then a signal processing unit 506 effects a suitable signal processing according to the color filters employed in the CCD 503, thereby providing a luminance signal (Y) and two color difference signals (Cr, Cb), which are temporarily stored in a buffer memory 507 (step 603).

Then a block forming unit 508 divides the entire image frame of the CCD 503 in the following manner. The image frame, assumed to have 768 and 488 pixels respectively in the horizontal and vertical directions, is divided into blocks of 8×8 pixels each. Thus there are formed 96 and 61 blocks respectively in the horizontal and vertical directions, represented by $B_{ij}$ (i=1–96, j=1–61).

Then an activity calculating unit 518 calculates the activity parameter of the entire image frame and each block in the following manner. The activity parameter of each block $B_{ij}$ is defined by:

$$a_{ij} = \sum_{n=1}^{8} \sum_{m=1}^{8} \left| X_{nm}^{(ij)} - \overline{X}^{(ij)} \right| \quad (14)$$

wherein
$X_{nm}^{(ij)}$ (n=1~8, m=1~8)
indicate 64 pixels of said block $B_{ij}$; and $\overline{x}^{(ij)}$ is the average value of the block $B_{ij}$.

Also the activity parameter A of the entire image frame is defined by:

$$A = \sum_{i=1}^{96} \sum_{j=1}^{61} a_{ij} \quad (15)$$

Figure 17:
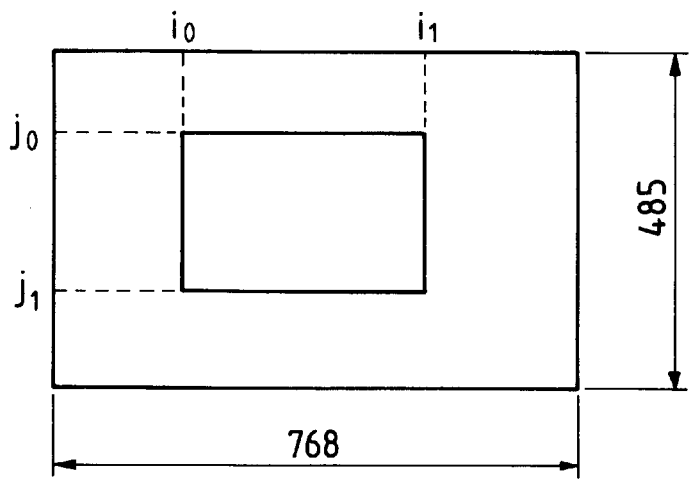
FIG. 17 is a view showing the image frame of the image sensor.

If a range-finding window for automatic focusing is formed as shown in FIG. 17, the definition (15) can be replaced by:

$$A = \sum_{i=i0}^{i1} \sum_{j=j0}^{j1} a_{ij} \quad (16)$$

The present embodiment employs the definition (15) representing the activity parameter of the entire image frame because it is preferable for the control of a digitizing unit 511, to be explained later. However, the definition (16) may also be likewise employed without difficulty in most cases.

When the activity $A_0$ for the initial lens position $X_L$ is calculated (step 604), k is increased by "1" (step 605), then the lens is moved to the right by a step d (step 607), and the sequence returns to the step 603 to determine the activity parameter $A_1$.

The activity parameters $A_k$ (k=0–n) for the lens positions $X_L$–kd are determined by repeating the above-explained operations, wherein n is the number of divisions in automatic focusing. When the activity parameters A for all the lens positions are determined (step 606), the sequence proceeds to a step 608.

Figure 18:
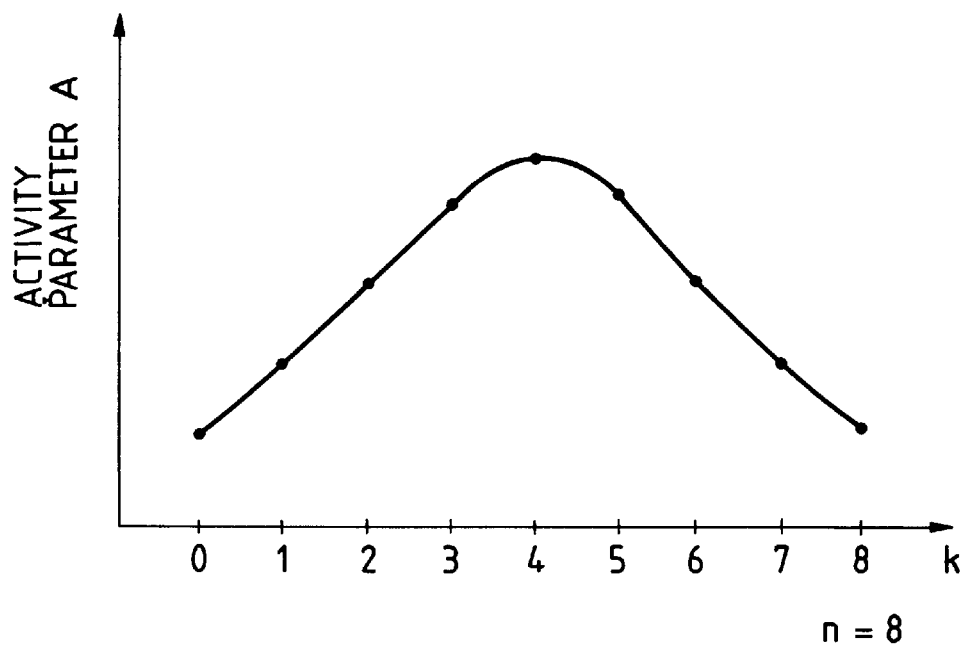
FIG. 18 is a chart showing the relationship between the lens position and the activity parameter.

These operations provide a characteristic curve as shown in FIG. 18, which indicates that a lens position with k=4 is best focused.

Then, in the step 608, the lens drive unit 520 again moves the lens 101 to the position corresponding to k=4. In this lens positions the image signal is again fetched into the memory 107 (step 609), and the block formation and the calculation of activity are conducted as explained above (step 610). Naturally it is also possible to store the activity parameter for k=4 calculated before, in a memory and to use the previously stored activity parameter. A switch 509 is closed at this point, and the signal divided into blocks is subjected to a fixed-length encoding for each image, according to the activity parameter A (step 612).

The image information thus compression encoded is recorded, through an interface 116, in a digital memory medium 517 such as a semiconductor memory card (step 613).

Figure 15:
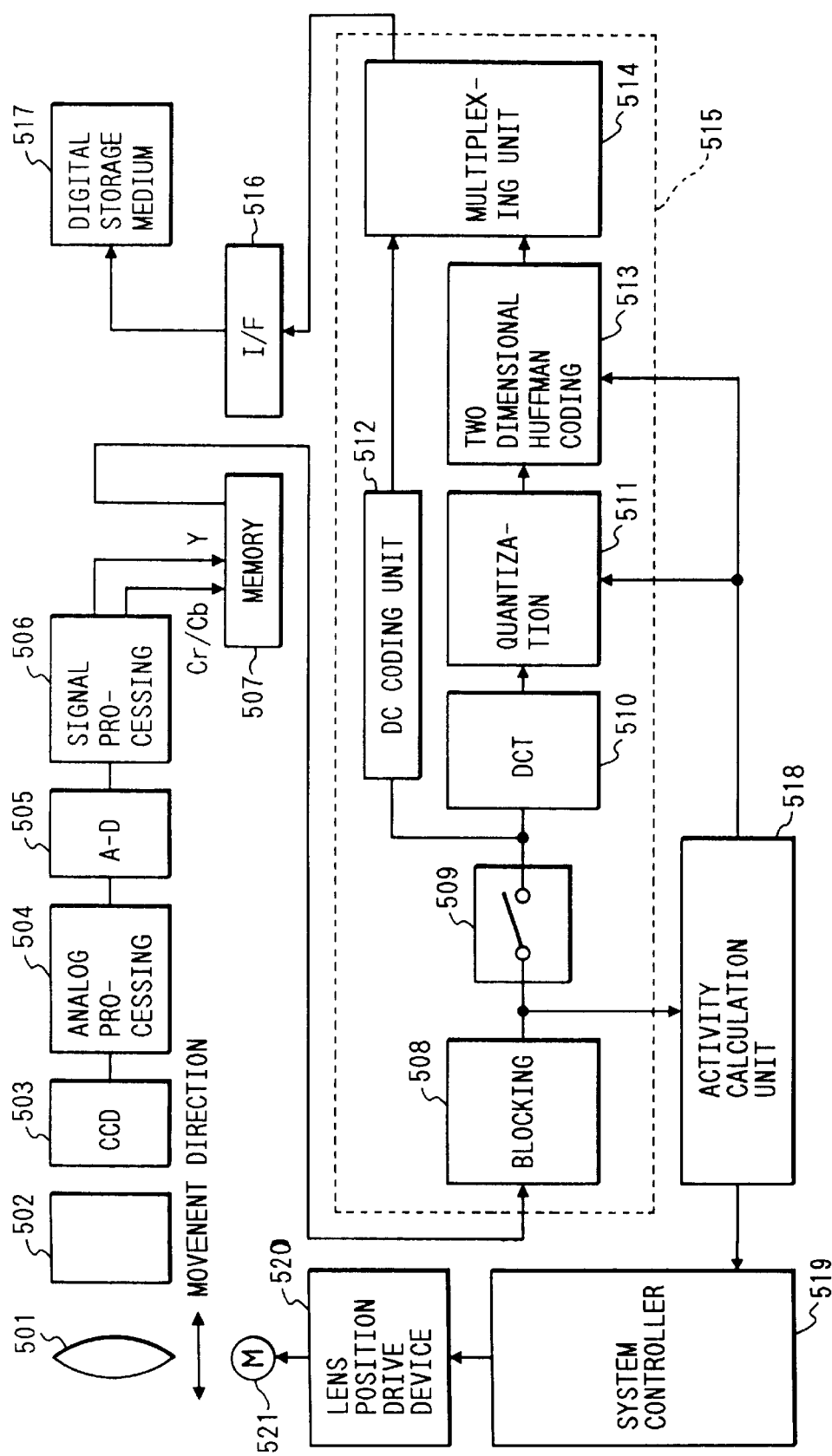
FIG. 15 is a block diagram of the image pickup device of a sixth embodiment.
Figure 16:
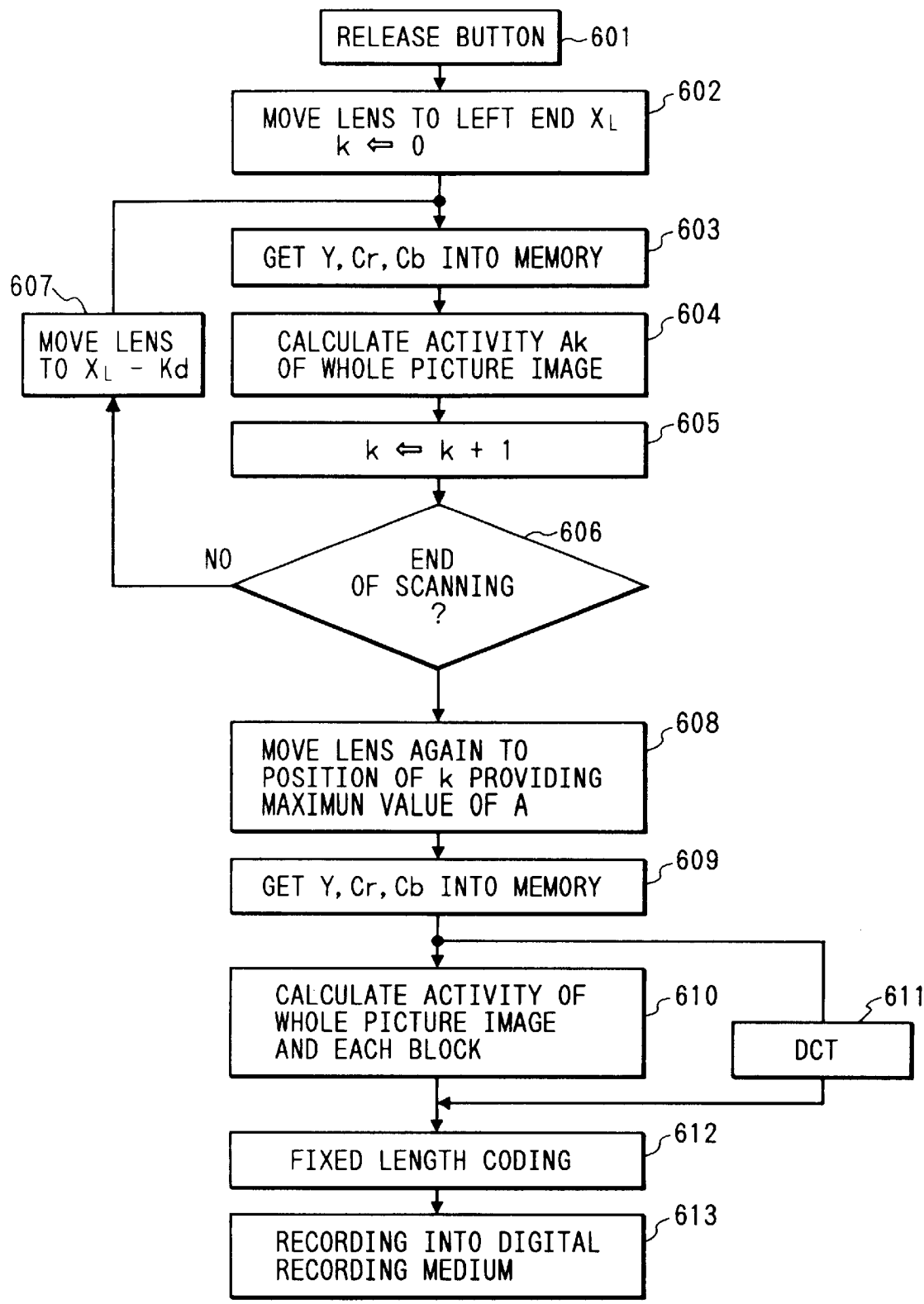
FIG. 16 is a flow chart showing the function of the image pickup device of the sixth embodiment.
Figure 19:
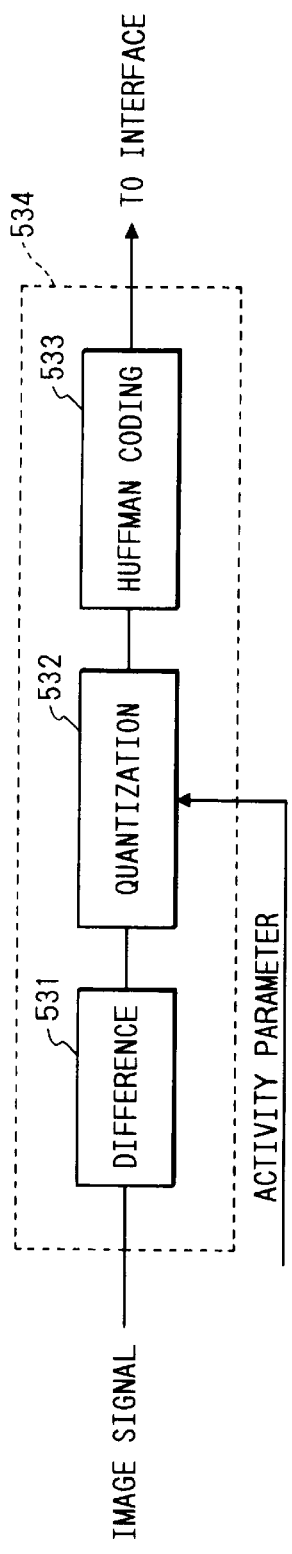
FIG. 19 is a schematic block diagram of the image pickup device of a seventh embodiment.

The compression unit 515 in FIG. 15 may be replaced by a compression unit 534 shown in FIG. 19, as a seventh embodiment. The input image signal is converted into a differential signal by a difference calculating unit 531, and is digitized in a digitizing unit 532 with suitable digitizing levels. In this manner so-called DPCM (differential PCM) compression encoding is achieved. The amount of codes can be regulated by varying the density of digitization in the digitizing unit 532 according to the activity parameter A.

Figure 20:
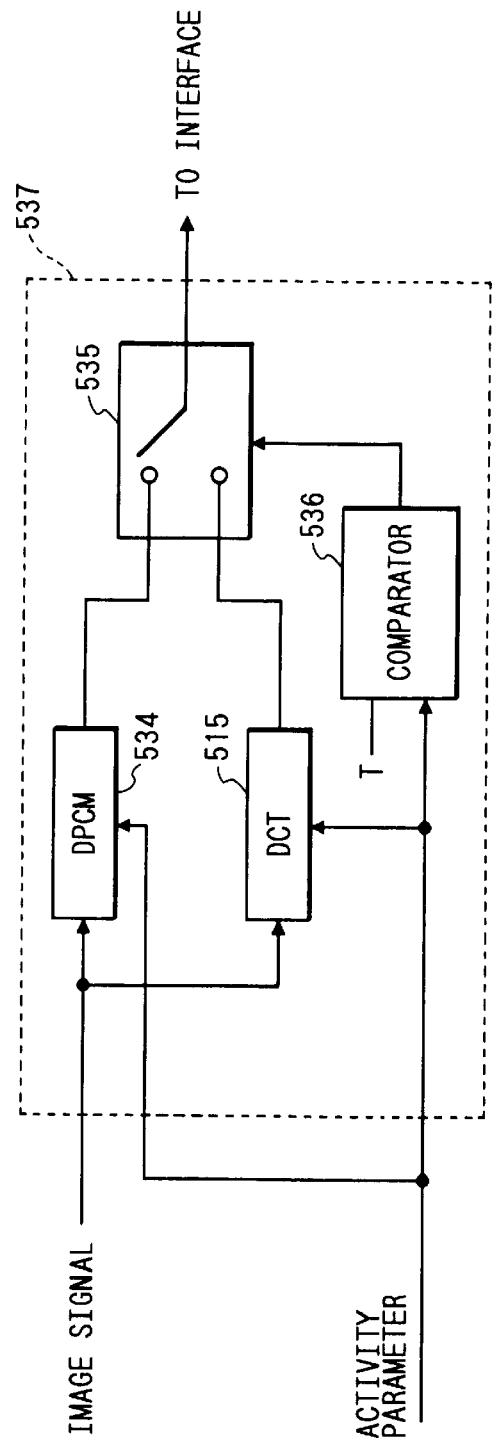
FIG. 20 is a schematic block diagram of the image pickup device of an eighth embodiment.

Furthermore, the compression unit 515 in FIG. 15 may be replaced by a compression unit 537 shown in FIG. 20, as an eighth embodiment. In FIG. 20, a DPCM unit 534 may be the same as that shown in FIG. 19, and a DCT unit 515 may be same as that shown in FIG. 15. Since the DCT method is more advantageous when the activity parameter is large, a comparator 536 compares the parameter with a threshold value T, and, if the former is larger, a switch 535 selects the output of the DCT unit.

The foregoing embodiments enable focusing operation utilizing the frequency analyzing function of the image information compressing unit without relying on a separate automatic focusing device, thereby obviating the need for a separate image signal analyzing circuit which has previously been required for focusing in the conventional image pickup device. It is therefore rendered possible to reduce the magnitude of circuitry of an image pickup device and also to reduce the power consumption thereof. Thus the number of images that can be taken with the image pickup device can be increased, particularly in case the device is operated with a battery.

The first to fifth embodiments effect plural focus state determinations based on the frequency analysis on all the blocks, but such process is not limiting. It is also possible, for example, to effect only one focus state determination based on the frequency analysis of all the blocks and then the focus state determination based on the frequency analysis on the blocks with a high content of high-frequency components, or to effect the focus state determination based only on the frequency analysis on the blocks with a high content of high-frequency components without that on all the blocks.

Also the sixth to eighth embodiments employ a digital recording medium, but the present invention is limited to such embodiments and the compression encoded signal may be released as a line signal.

The foregoing embodiments are merely given for the purpose of illustration and should not be interpreted as limiting.

The scope of the present invention is indicated by the appended claims, and is by no means limited by the text of the specification. Also any and all variations or modification, equivalent to the scope of the appended claims, belong to the present invention.

What is claimed is:

1. An image coding apparatus comprising:
   a) a phototaking optical system for guiding light from an object to an image sensor which produces image information in accordance with the light received from said object;
   b) division means for dividing the image information from said image sensor into a plurality of separate blocks;
   c) transformation means for transforming the image information divided by said dividing means into frequency information;
   d) extraction means for extracting from said plurality of blocks transformed by said transformation means, a number of blocks which have a high content of high-frequency components;
   e) means for providing focus information for focusing the light received from the object by said phototaking optical system on the basis of frequency information relating to the frequency components of said blocks extracted by said extraction means;
   f) drive means for driving said phototaking optical system according to the focus information; and
   g) compression means for compression encoding the image information transformed by said transformation means.

2. An image coding apparatus according to claim 4, further comprising:
   display means for displaying, in a view finder, areas corresponding to said blocks extracted by said extraction means.

3. An image coding apparatus according to claims 2, further comprising:
   reset means for causing said extraction means to perform said extraction again on all remaining blocks other than those previously extracted by said extraction means.

4. An image coding apparatus comprising:
   a) a phototaking optical system for guiding light from an object to an image sensor which produces image information in accordance with the light received from said object;
   b) division means for dividing the image information from said image sensor into a plurality of separate blocks;
   c) a viewfinder for displaying an image of an object under consideration by said phototaking optical system;
   d) transformation means for transforming the image information divided by said dividing means into frequency information;
   e) extraction means for extracting, from said plurality of blocks transformed by said transformation means, a number of blocks which include a large amount of high-frequency components;
   f) display means for displaying the areas corresponding to said number of blocks extracted by said extraction means on said viewfinder;
   g) focusing means for focusing light received from the object on the basis of frequency information of said blocks extracted by said extraction means; and
   h) compression means for compression encoding the image information transformed by said transformation means.

5. An image coding apparatus according to claim 4, wherein said extraction means extracts said number of blocks having a relatively high content of high-frequency components based on frequency information relating to one-dimensional frequency components in horizontal, vertical and diagonal directions.

6. An image coding apparatus according to claim 5, further comprising:
   reset means for causing said extraction means to perform said extraction again on all remaining blocks other than those previously extracted by said extraction means.

7. An image coding apparatus according to claim 4, further comprising:
   recording means for recording the image information, compressed by said compression means, on a recording medium.

8. An image coding apparatus comprising:
   a) a phototaking optical system for guiding light from an object to an image sensor which produces image information in accordance with the light received from said object;
   b) division means for dividing the image information from said image sensor into a plurality of separate blocks; transformation means for transforming the image information by said dividing means into frequency information;
   d) extraction means for extracting, from said plurality of blocks transformed by said transformation means, a number of blocks which include a large amount of high-frequency components;
   e) means for providing focus information for focusing the light received from the object by said phototaking optical system on the basis of frequency information relating to the frequency components of said blocks extracted by said extraction means;
   f) drive means for driving said phototaking optical system according to the focus information; and
   g) compression means for compression encoding the image information transformed by said transformation means.

9. An image pickup device according to claim 8, further comprising:
   display means for displaying, in a view finder, areas corresponding to said blocks extracted by said extraction means.

10. An image pickup device according to claim 8, further comprising:
    reset means for causing said extraction means to perform said extraction again on all remaining blocks other than those previously extracted by said extraction means.

11. An image processing apparatus comprising:
    a) input means for inputting image information, said image information being provided by a phototaking optical system for guiding light from an object to an image sensor which produces image information in accordance with the light received from said object;
    b) division means for dividing the image information inputted by said input means into a plurality of blocks;
    c) transformation means for transforming the image information divided by said division means into frequency information;

d) extraction means for extracting from said plurality of blocks transformed by said transformation means, a number of blocks which have a high content of high-frequency components;

e) means for obtaining focus information for focusing the light received from the object by said phototaking optical system on the basis of frequency information relating to the frequency components of said blocks extracted by said extraction means, said focus information being used to drive said phototaking optical system; and f) compression means for compression encoding the image information transformed by said transformation means.

12. An image processing method comprising the steps of:

inputting image information, the image information being provided by a phototaking optical system for guiding light from an object to an image sensor which produces image information in accordance with the light received from the object;

dividing the image information inputted in said inputting step into a plurality of blocks;

transforming the image information divided in said dividing step into frequency information;

extracting from the plurality of blocks transformed in said transformation step, a number of blocks which have a high content of high-frequency components;

obtaining focus information for focusing the light received from the object by the phototaking optical system on the basis of frequency information relating to the frequency components of the blocks extracted in said extraction step, the focus information being used to drive the phototaking optical system; and compression encoding the image information transformed in said transformation step.

* * * * *

UNITED STATES PATENT AND TRADEMARK OFFICE
CERTIFICATE OF CORRECTION

PATENT NO.    : 5,920,349
DATED         : July 6, 1999
INVENTOR(S)   : Tadashi Okino et al.

It is certified that error appears in the above-identified patent and that said Letters Patent is hereby corrected as shown below:

Title Page:
[56] References Cited, under U.S. PATENT DOCUMENTS:

"5,172,236 12/1993" should read --5,172,236 12/1992--.

IN THE DRAWINGS:
Sheet 18 of 20, Fig. 16, "MAXIMUM" should read --MAXIMUM--.

Column 1:
Line 13, "Image" should read --An image--; and
Line 16, "device" should read --devices--.

Column 3:
Line 40, "show" should read --shows--; and
Line 51, "said" should read --the--.

Column 4:
Line 13, "1," should read --(1,--;
Line 20, "have" should read --has--; and
Line 26, "before" should read --before.--.

Column 6:
Line 48, "substantilly" should read --substantially--.

Column 7:
Line 2, "said" should read --the--;
Line 5, "said" should read --the--;
Line 36, "have" should read --has--;
Line 39, "mined" should read --mination--; and
Line 42, "beofore." should read --before--.

Column 9:
Line 17, "an" should be deleted.

UNITED STATES PATENT AND TRADEMARK OFFICE
CERTIFICATE OF CORRECTION

PATENT NO.   : 5,920,349
DATED        : July 6, 1999
INVENTOR(S)  : Tadashi Okino et al.

It is certified that error appears in the above-identified patent and that said Letters Patent is hereby corrected as shown below:

Column 10:
Line 22, "results," should read --result,--;
Line 28, "said" should read --the--;
Line 29, "said" should read --the--;
Line 40, "produce" should read --shown--; and
Line 41, "show" should read --produce--.

Column 11:
Line 12, "embodiment of which" should read --embodiment, whose--; and
Line 38, "Said" should read --The--.

Column 12:
Line 15, "not" should read --not,--; and
Line 48, "variations" should read --variations,--.

Column 14:
Line 12, "positions" should read --position,--.

Column 15:
Line 8, "modification," should read --modifications,--;
Line 37, "claim 4," should read --claim 1,--; and Column 16:
Line 29, "transformation" should read --¶ c) transformation--.

Signed and Sealed this

Fourteenth Day of August, 2001

*Attest:*

*Attesting Officer*

NICHOLAS P. GODICI
*Acting Director of the United States Patent and Trademark Office*